(12) United States Patent
Lepage et al.

(10) Patent No.: US 12,480,914 B2
(45) Date of Patent: Nov. 25, 2025

(54) ADAPTIVE ULTRASONIC INSPECTION FOR VOLUMETRIC FLAWS

(71) Applicant: Evident Canada, Inc., Québec (CA)

(72) Inventors: Benoit Lepage, L'Ancienne-Lorette (CA); Jinchi Zhang, Quebec (CA)

(73) Assignee: Evident Canada, Inc., Québec (CA)

( * ) Notice: Subject to any disclaimer, the term of this patent is extended or adjusted under 35 U.S.C. 154(b) by 290 days.

(21) Appl. No.: 18/555,613

(22) PCT Filed: Apr. 26, 2022

(86) PCT No.: PCT/CA2022/050633
§ 371 (c)(1),
(2) Date: Oct. 16, 2023

(87) PCT Pub. No.: WO2022/226638
PCT Pub. Date: Nov. 3, 2022

(65) Prior Publication Data
US 2024/0369515 A1    Nov. 7, 2024

Related U.S. Application Data

(60) Provisional application No. 63/201,485, filed on Apr. 30, 2021.

(51) Int. Cl.
    *G01N 29/06*    (2006.01)
    *G01N 29/04*    (2006.01)
    (Continued)

(52) U.S. Cl.
    CPC ......... *G01N 29/069* (2013.01); *G01N 29/043* (2013.01); *G01N 29/221* (2013.01);
    (Continued)

(58) Field of Classification Search
    None
    See application file for complete search history.

(56) References Cited

U.S. PATENT DOCUMENTS

| 7,581,444 B2 | 9/2009 | Maurer et al. |
| 8,596,127 B2 | 12/2013 | Falter et al. |

(Continued)

FOREIGN PATENT DOCUMENTS

| JP | 2004109129 | 4/2004 |
| JP | 2007147544 | 6/2007 |

(Continued)

OTHER PUBLICATIONS

"European Application Serial No. 22794138.2, Response filed Dec. 29, 2023 to Communication pursuant to Rules 161(1) and 162 EP", 1 pgs.

(Continued)

*Primary Examiner* — Suman K Nath
(74) *Attorney, Agent, or Firm* — Schwegman Lundberg & Woessner, P.A.

(57) ABSTRACT

Acoustic evaluation of a target can be performed using an array of electro-acoustic transducers. For example, a technique for such evaluation can include generating acoustic transmission events using different transmitting apertures, the apertures defined by corresponding zones along the array, the zones including multiple electro-acoustic transducer elements. In response to the respective acoustic transmission events. respective acoustic echo signals are received. Representations of the respective received acoustic echo signals are coherently summed. The coherently summing includes applying determined nominal element delay factors to the respective representations to approximate a virtual probe normal to a nominal shape of a surface of a structure being inspected. A pixel or voxel value is corresponding to a specified spatial location within the structure being inspected is generated using the coherently summed representations.

27 Claims, 20 Drawing Sheets

(51) Int. Cl.
*G01N 29/22* (2006.01)
*G01N 29/44* (2006.01)
*G01N 29/26* (2006.01)

(52) U.S. Cl.
CPC ....... *G01N 29/223* (2013.01); *G01N 29/4463* (2013.01); *G01N 29/262* (2013.01); *G01N 2291/0289* (2013.01); *G01N 2291/106* (2013.01); *G01N 2291/2626* (2013.01)

(56) References Cited

U.S. PATENT DOCUMENTS

| | | |
|---|---|---|
| 8,767,510 B2 | 7/2014 | Robert et al. |
| 2013/0144170 A1 | 6/2013 | Chang et al. |
| 2018/0055486 A1* | 3/2018 | Tsushima ............ G01S 15/8918 |
| 2020/0046323 A1* | 2/2020 | Tanaka ................ G01S 7/52026 |
| 2022/0155440 A1* | 5/2022 | Kruse .................. A61B 8/5207 |

FOREIGN PATENT DOCUMENTS

| | | |
|---|---|---|
| JP | 2007216003 | 8/2007 |
| JP | 2010145114 | 7/2010 |
| JP | 2012239813 | 12/2012 |
| JP | 2013156277 | 8/2013 |
| JP | 2019039902 | 3/2019 |
| JP | 7730923 | 8/2025 |
| WO | WO-2022226638 A1 | 11/2022 |

OTHER PUBLICATIONS

"European Application Serial No. 22794138.2, Extended European Search Report mailed Aug. 9, 2024", 4 pgs.

"Japanese Application Serial No. 2023-566679, Notification of Reasons for Refusal mailed Nov. 18, 2024", w English Translation, 7 pgs.

"Japanese Application Serial No. 2023-566679, Response filed Feb. 14, 2025 to Notification of Reasons for Refusal mailed Nov. 18, 2024", W English Claims, 11 pgs.

"Canadian Application Serial No. 3,217,829, Examiners Rule 86(2) Report mailed Jan. 31, 2025", 3 pgs.

"International Application Serial No. PCT/CA2022/050633, International Search Report mailed Jun. 30, 2022", 3 pgs.

"International Application Serial No. PCT/CA2022/050633, Written Opinion mailed Jun. 30, 2022", 3 pgs.

"Video images for Inspect Complex Geometry with the FOCUS PX System and Coherent Adaptive Focusing Technology", youtube.com, [Online]. Retrieved from the Internet: <URL: https://www.youtube.com/watch?v=IkdkblmHT5Q&feature=youtu.be >, (Aug. 26, 2020), 14 pgs.

Beardsley, B, et al., "A Simple Scheme for Self-Focusing of an Array, Journal of Nondestructive Evaluation", Journal of Nondestructive Evaluation, vol. 14, No. 4, (1995), 169-179.

Lamarre, Andre, et al., "Coherent Adaptive Focusing Technology for the Inspection of Variable Geometry Composite Material", 10th International Symposium on NDT in Aerospace, [Online]. Retrieved from the Internet: <URL: https://www.ndt.net/article/aero2018/papers/Th.5.C.4.pdf>, (2018), 16 pgs.

Mahaut, "Development of phased array techniques to improve characterization of defect located in a component of complex geometry", Ultrasonics, vol. 40, Issues 1-8, (2002), 165-169.

"Canadian Application Serial No. 3,217,829, Response filed May 13, 2025 to Examiners Rule 86(2) Report mailed Jan. 31, 2025", w English Claims, 16 pgs.

"Japanese Application Serial No. 2023-566679, Final Notification of Reasons for Refusal mailed May 27, 2025", w English translation, 4 pgs.

"Japanese Application Serial No. 2023-566679, Response filed Jul. 2, 2025 to Final Notification of Reasons for Refusal mailed May 27, 2025", w english claims, 9 pgs.

* cited by examiner

ADAPTIVE ULTRASONIC INSPECTION FOR VOLUMETRIC FLAWS

CLAIM OF PRIORITY

This patent application is a U.S. National Stage filing under 35 U.S.C. § 371 from International Application No. PCT/CA2022/050633, entitled "ADAPTIVE ULTRASONIC INSPECTION FOR VOLUMETRIC FLAWS," to Lepage et al., filed Apr. 26, 2022, which claims the benefit of priority of Lepage et al., U.S. Provisional Patent Application Ser. No. 63/201,485, entitled "ADAPTIVE ULTRASONIC INSPECTION FOR VOLUMETRIC FLAWS," filed on Apr. 30, 2021, which are hereby incorporated by reference herein in their entireties.

FIELD OF THE DISCLOSURE

This document pertains generally, but not by way of limitation, to non-destructive evaluation, and more particularly, to apparatus and techniques for providing acoustic inspection in adaptive manner for detecting subsurface or internal defects in structures such as bars.

BACKGROUND

Various inspection techniques can be used to image or otherwise analyze structures without damaging such structures. For example, one or more of x-ray inspection, eddy current inspection, or acoustic (e.g., ultrasonic) inspection can be used to obtain data for imaging of features on or within a test specimen. For example, acoustic imaging can be performed using an array of ultrasound transducer elements, such as to image a region of interest within a test specimen.

SUMMARY OF THE DISCLOSURE

Acoustic inspection can be used to detect volumetric or near-surface flaws in a non-destructive manner. For example, in bar inspection, sets of ultrasonic inspection probes can be located at various positions radially around a bar under test. Volumetric scan can be performed by acquiring B-Scan imaging data comprising a series of stacked E-Scan images. Such an approach can present various challenges, such as producing imaging that does not represent a flaw location in a manner corresponding to the actual physical location of the flaw. Such imaging may also be prone to masking or suppressing flaw identification in the presence of misalignment between the probe assembly and the bar under test. The present inventors have recognized, among other things, that an adaptive approach can be used to determine individual probe element delay compensation values to compensate for misalignment, and a zonal imaging approach can be used including a sparse matrix acquisition scheme (referred to herein as zonal Dynamic Depth Focusing) that can provide imaging that more meaningfully represents a physical flaw location. Various examples described herein may also be used for shear wave imaging, such as for back-wall surface or near-surface flaw inspection.

In an example, acoustic evaluation of a target can be performed using an array of electro-acoustic transducers. For example, a technique for such evaluation can include generating respective acoustic transmission events using different transmitting apertures, the apertures defined by corresponding zones along the array, the zones include multiple electro-acoustic transducer elements. In response to the respective acoustic transmission events, respective acoustic echo signals are received, using receiving ones of the electro-acoustic transducer elements, to form a group of received acoustic echo signals. For example, the group is indexed by transmit-receive pairs including a respective transmit zone and a respective one of the receiving elements. Representations of the respective received acoustic echo signals are coherently summed. The representations correspond to the respective transmit-receive pairs. The coherently summing including applying determined nominal element delay factors to the respective representations to approximate a virtual probe normal to a nominal shape of a surface of a structure being inspected. Respective delay factor corrections are applied to compensate for variation from the nominal shape or a nominal alignment of the surface of the structure with respect to the array of electro-acoustic transducers. A pixel or voxel value is corresponding to a specified spatial location within the structure being inspected is generated using the coherently summed representations.

In an example, an ultrasonic inspection system for acoustic evaluation of a target uses an array of electro-acoustic transducers. An analog front end comprising transmit and receive circuitry is coupled to the array of electro-acoustic transducer elements. A processor circuit is communicatively coupled with the analog front end. A memory circuit comprising instructions that, when executed by the processor circuit, cause the system to perform tasks. For example, the instructions include generating respective acoustic transmission events using different transmitting apertures, the apertures defined by corresponding zones along the array, the zones include multiple electro-acoustic transducer elements. In response to the respective acoustic transmission events, respective acoustic echo signals are received, using receiving ones of the electro-acoustic transducer elements, to form a group of received acoustic echo signals. For example, the group is indexed by transmit-receive pairs including a respective transmit zone and a respective one of the receiving elements. Representations of the respective received acoustic echo signals are coherently summed. The representations correspond to the respective transmit-receive pairs. The coherently summing including applying determined nominal element delay factors to the respective representations to approximate a virtual probe normal to a nominal shape of a surface of a structure being inspected. Respective delay factor corrections are applied to compensate for variation from the nominal shape or a nominal alignment of the surface of the structure with respect to the array of electro-acoustic transducers. A pixel or voxel value is corresponding to a specified spatial location within the structure being inspected is generated using the coherently summed representations.

In an example, an ultrasonic inspection system for acoustic evaluation of a target uses an array of electro-acoustic transducers. The system includes a means for generating respective acoustic transmission events using different transmitting apertures. The apertures are defined by corresponding zones along the array. The zones include multiple electro-acoustic transducer elements. In response to the respective acoustic transmission events, the system includes means for receiving respective acoustic echo signals, using receiving ones of the electro-acoustic transducer elements, to form a group of received acoustic echo signals. For example, the group is indexed by transmit-receive pairs including a respective transmit zone and a respective one of the receiving elements. The system includes means for coherently summing representations of the respective received acoustic echo signals. The representations correspond to the respective transmit-receive pairs. The coherently summing includes applying determined nominal element delay factors to the respective representations to approximate a virtual probe normal to a nominal shape of a surface of a structure being inspected. Respective delay factor corrections are applied to compensate for variation from the nominal shape or a nominal alignment of the surface of the structure with respect to the array of electro-acoustic transducers. The system includes means for generating a pixel or voxel value is corresponding to a specified spatial location within the structure being inspected is generated using the coherently summed representations.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Acoustic testing, such as ultrasound-based inspection, can include focusing or beam-forming techniques to aid in construction of data plots or images representing a region of interest within the test specimen. Use of an array of ultrasound transducer elements can include use of a phased-array beamforming approach and can be referred to as Phased Array Ultrasound Testing (PAUT). For example, a delay-and-sum beamforming technique can be used such as including coherently summing time-domain representations of received acoustic signals from respective transducer elements or apertures. The techniques herein facilitate one or more of enhanced inspection productivity (e.g., throughput or sensitivity to flaws), reduced sensitivity to positioning errors, and more-intuitive imaging that represents flaws in a manner more easily understandable to inspection personnel or analysts.

Figure 1:
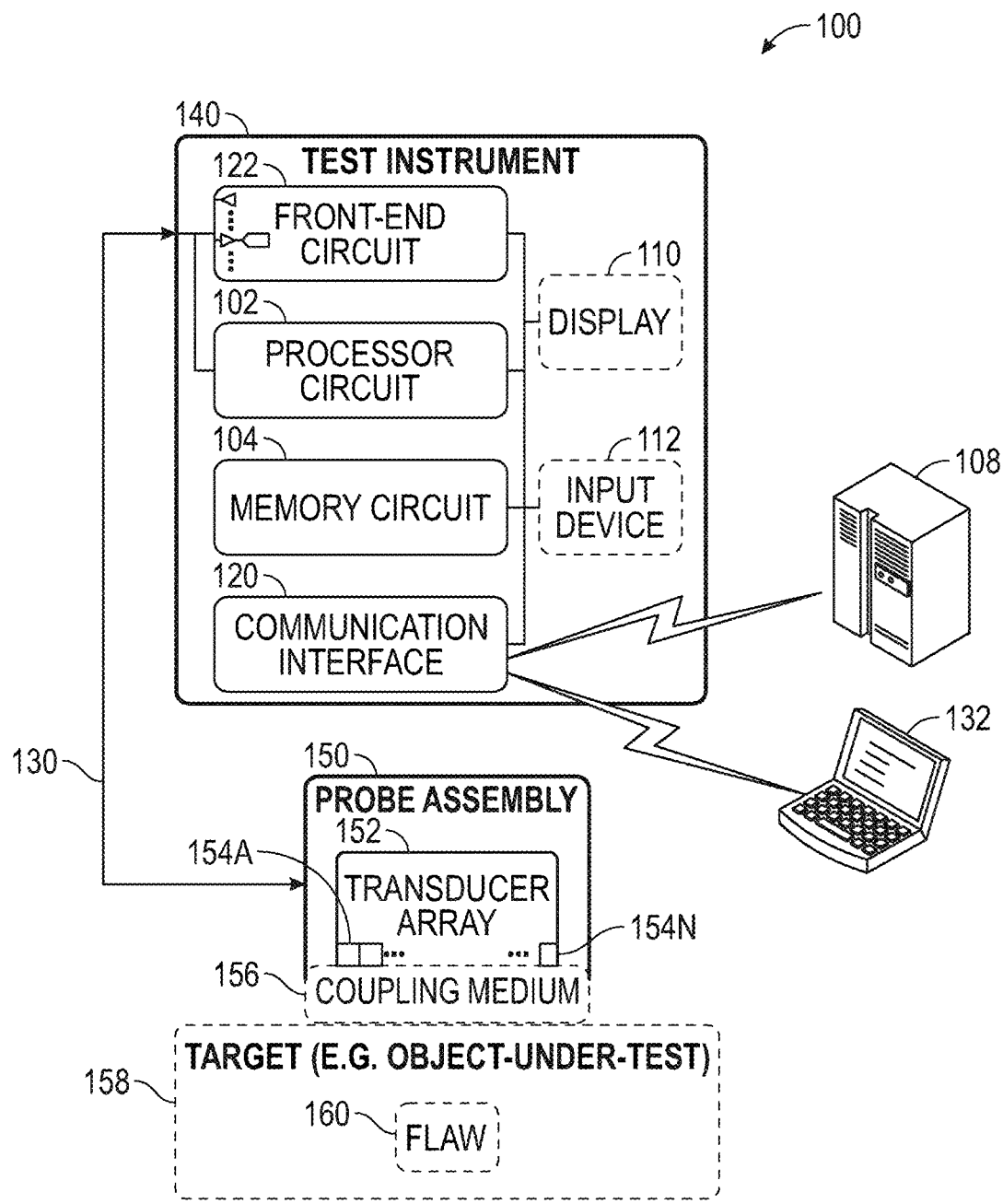
FIG. 1 illustrates generally an example comprising an acoustic inspection system, such as can be used to perform one or more techniques showed and described elsewhere herein.

FIG. 1 illustrates generally an example comprising an acoustic inspection system 100, such as can be used to perform at least a portion one or more techniques as shown and described herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electro-acoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., a test specimen or "object-under-test") through a coupling medium 156. The coupling medium can include a fluid or gel or a solid membrane (e.g., an elastomer or other polymer material), or a combination of fluid, gel, or solid structures. For example, the coupling medium can include water an/or other fluids.

The test instrument 140 can include digital and analog circuitry, such as a front-end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification. While the test structure may be referred to specifically as a bar herein, it is to be understood that the test structure can be any kind of structure in which internal visualization is desired.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for pitch/catch inspection modes. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit 104, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data or other representations of such data, for example, can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

In the examples in this document, data is generally acquired using groups of transducer elements fired contemporaneously, the groups defining transmit acquisition "zones.", acoustic transmission events occur where an acoustic pulse is generated using a group of transducers in the corresponding zone. According to some examples, one or more of the elements of the group of transducers that contributed to the pulse events also are used as receive elements. In some cases, other elements in array receive echo signals (reflections or scattered acoustic energy) elicited in response to the acoustic transmission. An acquisition matrix is defined first in two axes where a first axes corresponds to each transmit event, and a second axis corresponds to each receiving location. Each element in the matrix comprises time-series data (e.g., an elementary "A-Scan") corresponding to a particular receiving location and a corresponding transmit event. Generally, groups of elements can be used for transmission during individual transmission events and groups of elements can be used for receiving during the receive events, such as to provide desired transmission or receive apertures or transmit-receive combinations.

To construct an image of a particular location (e.g., a pixel or voxel location in the imaging data), generally, contributions from signals received at each transducer element in response to each transmission event are summed, including selecting appropriate samples from the corresponding A-Scans corresponding to the spatial location (and related propagation path) of the pixel or voxel. The A-Scan data can include real-valued time-series information or analytic form. Because the propagation path influences that summation for each voxel or pixel, filtering or modulation of signals can be performed in response to one or more characteristics of the propagation path, such as by weighting particular terms in the summation using knowledge of the propagation path. As mentioned above, variation between the modeled propagation path and the actual path traversed during acquisition can produce imaging artifacts.

Ultrasonic bar inspection of volumetric flaws generally relies on electronic scan (E-SCAN), such as focalized on the back wall of the bars, using multiple physically-separate phased-array probes. When high sensitivity levels are required (for example, for reliable detection of a calibration feature such as an 0.5 mm Flat Bottom Hole), generally-available methods can limit inspection throughput.

Figure 2A:
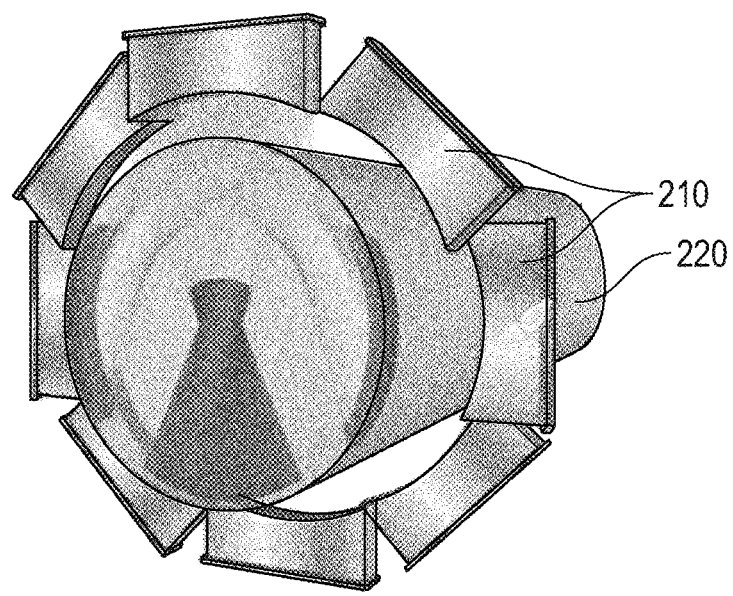
FIG. 2A illustrates an example of a bar inspection system having a plurality of probes.

FIG. 2A illustrates an example bar inspection system having a plurality of probes 210 in accordance with examples described herein. Each probe 210 has a plurality of transducer elements. Each probe 210 may be located on an independent plane (allowing independent parallel firing of the probes). According to various examples, the same phased array probes can be programmed to provide one or both of longitudinal wave (LW) and shear wave (SW) pulsing to inspect the central volume and/or subsurface volume of a test structure 220. In some cases, the same phased array probes can be programmed to alternate between LW and SW pulses.

Figure 2B:
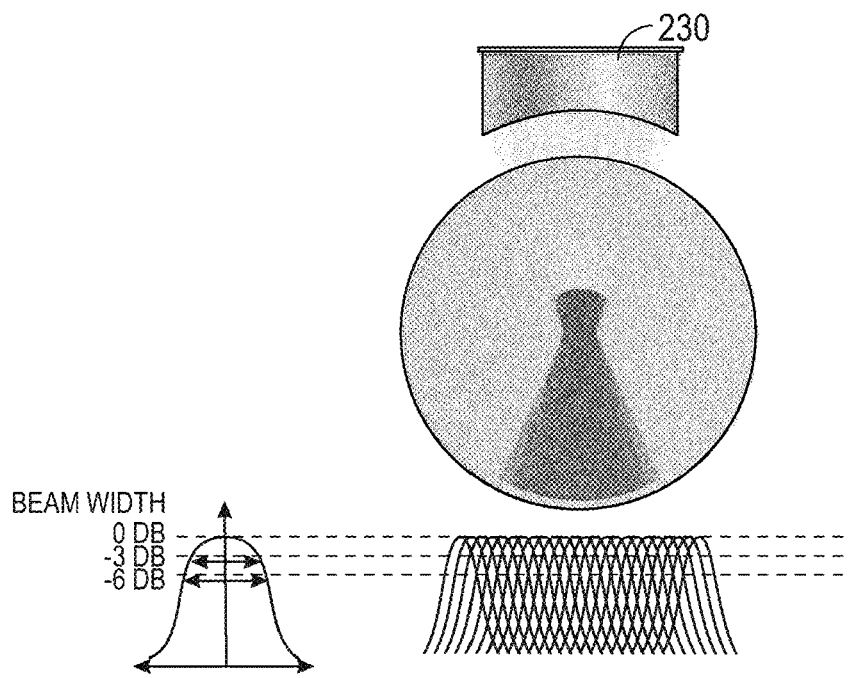
FIG. 2B illustrates an example of phased array beams that can be generated by an ultrasonic probe.

As an example, one approach can be based on testing using sets of 128 element probes. The inspection for volumetric flaw (using LW) may generally involve beams formed with 32 elements for an aperture, aperture steps of 8 elements. In these conditions, 13 independent beams are generated to conduct the inspection for each of the positions in the scan axis. FIG. 2B illustrates an example of phased array beams that can be generated by an ultrasonic probe 230 in accordance with examples described herein.

Such an approach for bar inspection outputs B-Scan images corresponding to each probe 210 array formed by stacking the multiple (e.g., 13) independent E-SCAN beams next to each other. While this provides an image, it does not generally provide a physically meaningful representation of an actual flaw location or geometry and may be difficult to interpret. Such an approach may also preclude combination of the various B-Scan images from each probe locations around the radius of the bar into a single representative image of the interior or subsurface region of the bar under test.

Figure 3A:
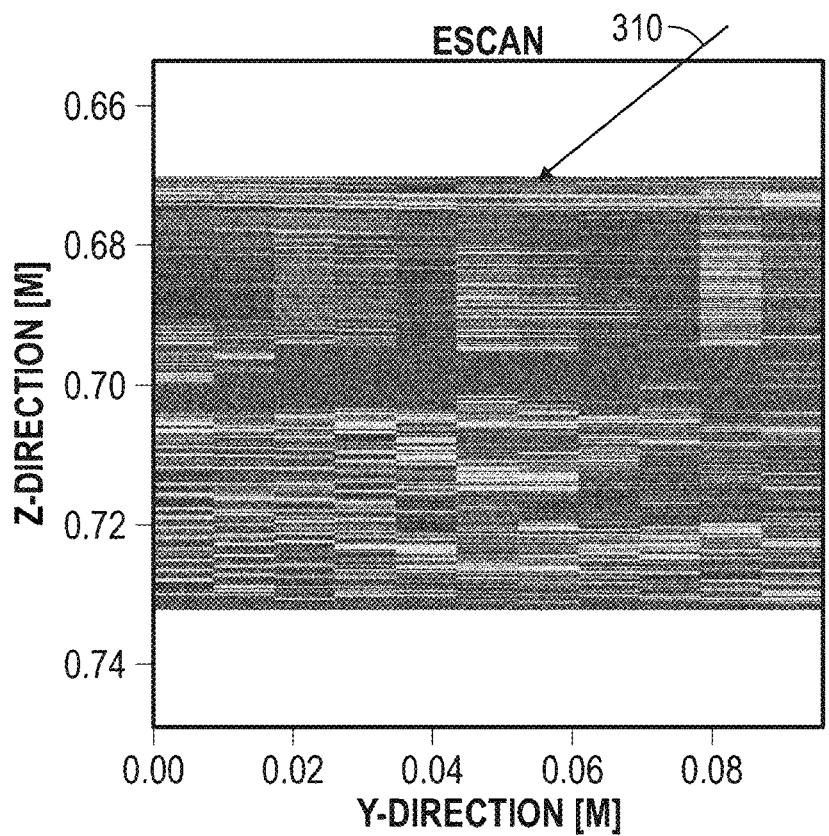
FIG. 3A shows an illustrative example comprising acquired E-scan images stacked next to each other, the E-Scan images obtained by scanning an 0.5 millimeter (mm) mid-wall flat bottom hole (MWFBH) flaw using beams similar to those shown in FIG. 2B.
Figure 3B:
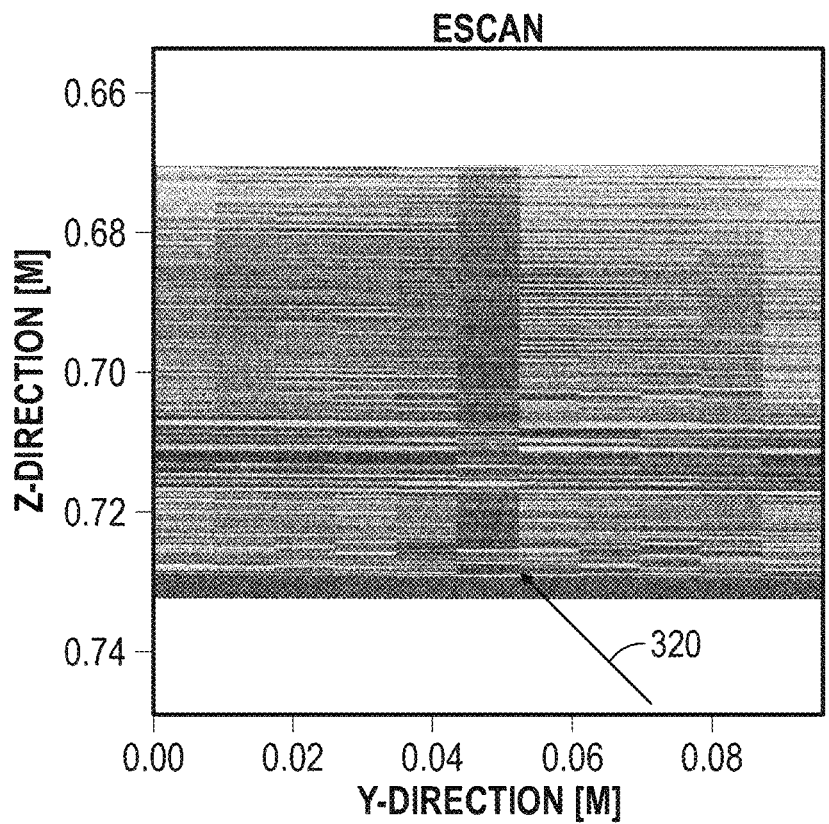
FIG. 3B shows an illustrative example comprising acquired E-scan images
stacked next to each other, the E-Scan images obtained by scanning of an 0.5 mm back wall flat bottom hole (FBH) flaw.

FIG. 3A shows an illustrative example of acquired E-scan images stacked next to each other, the E-Scan images obtained by scanning an 0.5 millimeter (mm) mid-wall flat bottom hole (MWFBH) flaw using beams similar to those shown in FIG. 2B. FIG. 3B shows an illustrative example comprising acquired E-scan images stacked next to each other, the E-Scan images obtained by scanning of an 0.5 mm back wall flat bottom hole (FBH) flaw. The FBH flaws are indicated by the arrows 310, 320, and the mid-wall flaw appears much wider in the image than the actual hole size because all beams pass through the center of the bar.

Figure 4:
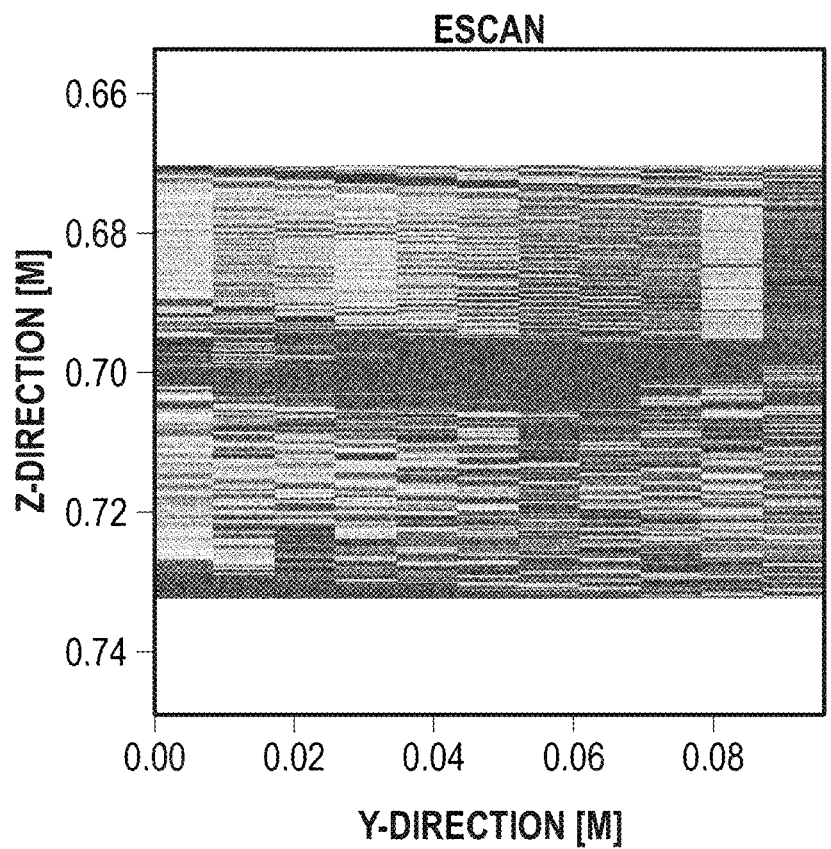
FIG. 4 illustrates an example comprising another acquisition using the same 0.5 mm MWFBH flaw of FIG. 3A, but with a 0.5 mm lateral mechanical offset of the probe assembly relative to the nominal, centered, probe position and showing weakly-resolved detail of the flaw.

The approach above may also present reliability or repeatability challenges because the existing approach generally involves precise mechanical positioning of the inspected product within the system relative to the one or more inspection probes, such as requiring on the order of 0.1 mm precision for repeatability. Such a constraint increases complexity (and cost) of the associated mechanical bar positioning or support system. Such a constraint may also limit achievable detection capabilities, or may preclude inspection entirely, as production bars generally are not perfectly straight. For example, FIG. 4 illustrates an example comprising another acquisition using the same 0.5 mm MWFBH flaw of FIG. 3A, but with a 0.5 mm lateral mechanical offset of the probe assembly relative to the nominal, centered, probe position and showing weakly-resolved detail of the flaw.

illustrates re--inspection of the same 0.5MWFBH with a 0.5 mm lateral mechanical offset showing very weak detection (e.g., the flaw is no longer clearly visible at the top of the E-SCAN image).

The subject matter described herein enables relatively higher productivity through the use of a large aperture transmission, such as can be focused at the center of the test structure. Voxel-based focusing can be used such as for imaging, processed using received acoustic echo signals, such as using a coherent summation approach in a manner similar to a Total Focusing Method (TFM) approach, but in receive mode, rather than requiring a full-matrix capture approach. The technique described herein can be referred to as a zonal Dynamic Depth Focusing (zDDF) approach. Because large aperture transmission (e.g., "zonal" transmission) insonifies a large portion of the bar, and because the reception beam forming approach permits detection of flaws including those flaws that are off-angle with relatively high focalization (e.g., high F-Number) power, the zDDF approach shown and described herein can match or exceed detection performance of other approaches (in terms of detection capabilities), such as using as few as three transmission events for a 128 element probe (e.g., using a 64 element aperture).

Figure 5:
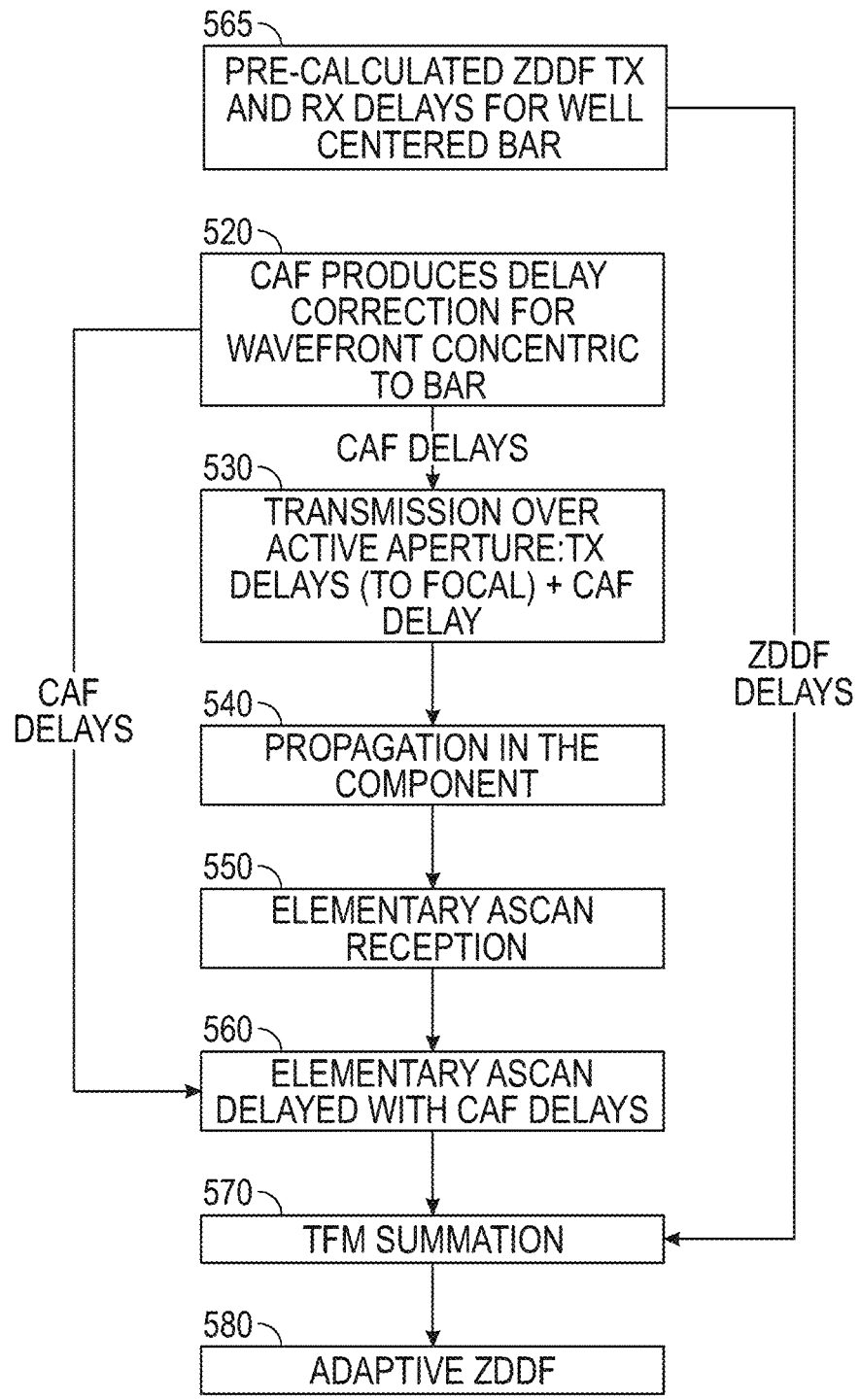
FIG. 5 illustrates an example comprising an adaptive bar inspection principle that can use a zonal Dynamic Depth Focusing (zDDF) approach.

FIG. 5 illustrates an example comprising an adaptive bar inspection principle that can use a zonal Dynamic Depth Focusing (zDDF) approach in accordance with examples described herein. It is possible to combine zDDF with Coherent Adaptive Focusing (CAF, sometimes referred to as Surface Adaptive Ultrasound) by re-using a delay produced by the CAF technique to form a virtual probe at a prescribed position relative to the bar. This can be achieved naturally by a CAF technique which converges on an acoustic wavefront parallel to a bar surface. Generally, bar inspection system (BIS) inspection probes are meant to be concentric with a bar structure under test (e.g., concentric when the system is well-aligned). Establishing a virtual probe allows for a system where the inspection probes may not be concentric to the bar structure under test. Transmission and reception beamforming delays can be applied in combination with CAF-established delay to produce an adaptive zDDF approach.

Specifically, the virtual probe may be generated by producing at 520 a CAF delay correction for the wavefront so that the wavefront is substantially concentric to the bar. This can represent transducer element delay factors that compensate for off-nominal positioning of the bar relative to the transducer array, lack of concentricity, or non-cylindrical deviation in bar shape, or combinations thereof. The wavefront is generated by generating respective acoustic transmission events using different transmitting apertures. According to various configurations described herein, the apertures are defined by corresponding zones along an array of electro-acoustic transducers. The wavefront is transmitted at 530 over an active aperture (e.g., a "zone") using element-level transmission delays to establish a desired focal position and the CAF compensation delays. The wavefront propagates at 540 in the bar structure under test. Respective acoustic echo signals are received at 550. The received element-level A-scan is delayed at 560 using the produced CAF compensation delay's corresponding to the respective receive element. The nominal zDDF transmission or reception delays (or both) for a substantially centered bar may be pre-calculated at 565. These precalculated delays may be summed at 570 with the CAF compensation delays to produce at 580 adaptive zDDF inspection results.

Figure 6:
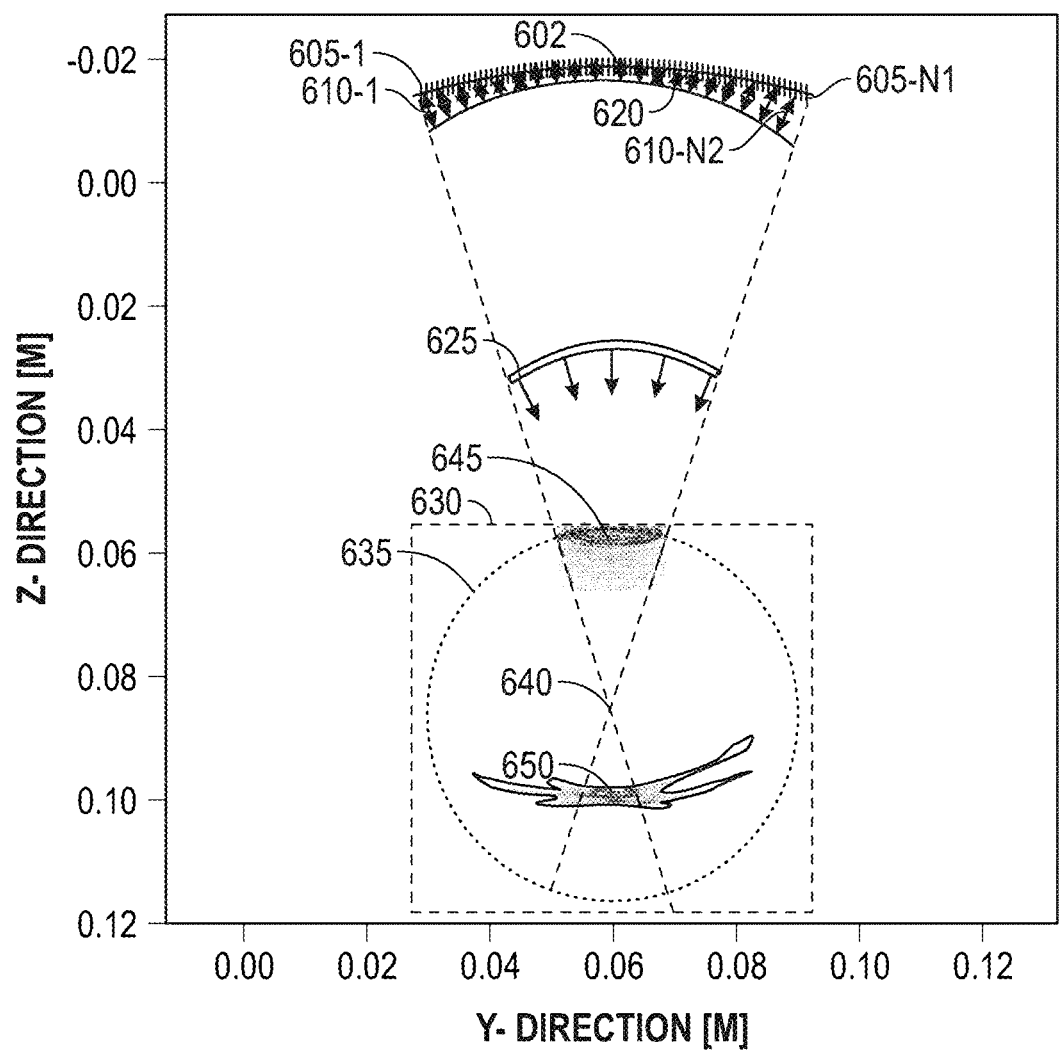
FIG. 6 illustrates a view of an inspection configuration that can combine zDDF with a Coherent Adaptive Focusing (CAF) approach.

FIG. 6 illustrates a view of an inspection configuration that can combine zDDF with a Coherent Adaptive Focusing (CAF) approach in accordance with examples described herein. A probe 602 has a plurality of transducer elements 605-1 through 605-N1. In order to produce a wavefront that is substantially concentric with the bar under test 635, a plurality of CAF delays 610-1 through 610-N2 are determined to provide compensation for off-nominal probe 602 positioning or non-cylindrical bar 635 geometry (or both). According to various configurations the count of delay values is the same as the count of transducer elements. In other examples, the count of delay values can be different than the number of transducer elements. The count of delay values may depend on a dimension of the probe. For example, a delay value may be calculated at specified locations along a surface of the probe that is facing the bar. The CAF delays may be applied on one or both of the transmission and on the reception A-scans, such as on an element-by-element basis. The CAF delays are used to establish a wavefront that would be equivalent to a wavefront 625 generated from a virtual probe position 620 in order to establish transmit and receive focusing within the imaging area 630. A single wavefront 625 can be transmitted from the whole aperture, and the aperture need not encompass an entirety of the probe 602. The single wavefront 625 may be substantially concentric with the bar when compensation using CAF delays is performed. According to various configurations, the acquisition can be performed using CAF compensation where CAF delays are determined corresponding to a front wall 645 profile of the bar with a transmission focal position 640 at substantially the center of the bar 635. A flaw representation 650 in the sector of the bar being scanned is shown. According to various examples, the focal position is in a location other than at the center of the bar. According to various examples, the focal position is in a location other than at the center of the bar. In this case, the same CAF delays may be used to create a virtual probe from which actual delays are added to generate a focal position at the desired location.

Figure 7:
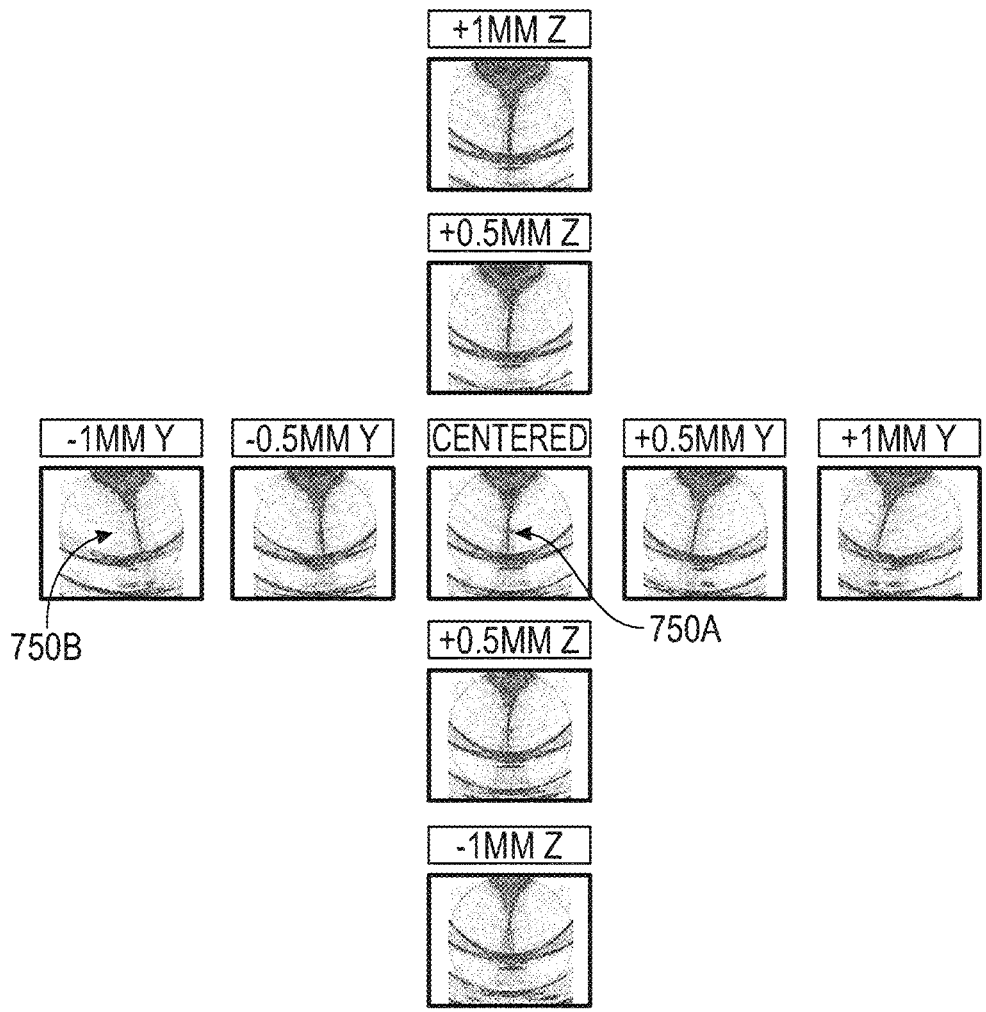
FIG. 7 illustrates zDDF results without using the CAF-based technique for various probe positions relative to the bar under test.

FIG. 7 illustrates zDDF results without using the CAF-based technique for various probe positions relative to the bar under test in accordance with examples described herein. In this example, the bar structure has about a 60 mm diameter and the flaw 750A, 750B is about 0.5 mm MWFBH. According to some examples, the flaw indication in the image is weakened, distorted, and/or completely absent in when CAF is not performed and the bar is not centered. This is especially apparent when there is lateral misalignment (e.g., in the y direction). The flaw 750A in the centered bar is readily more apparent than the flaw 750B in the bar that is laterally misaligned. The flaw echo is also weakened in the z-direction when compared to a centered bar.

Figure 8:
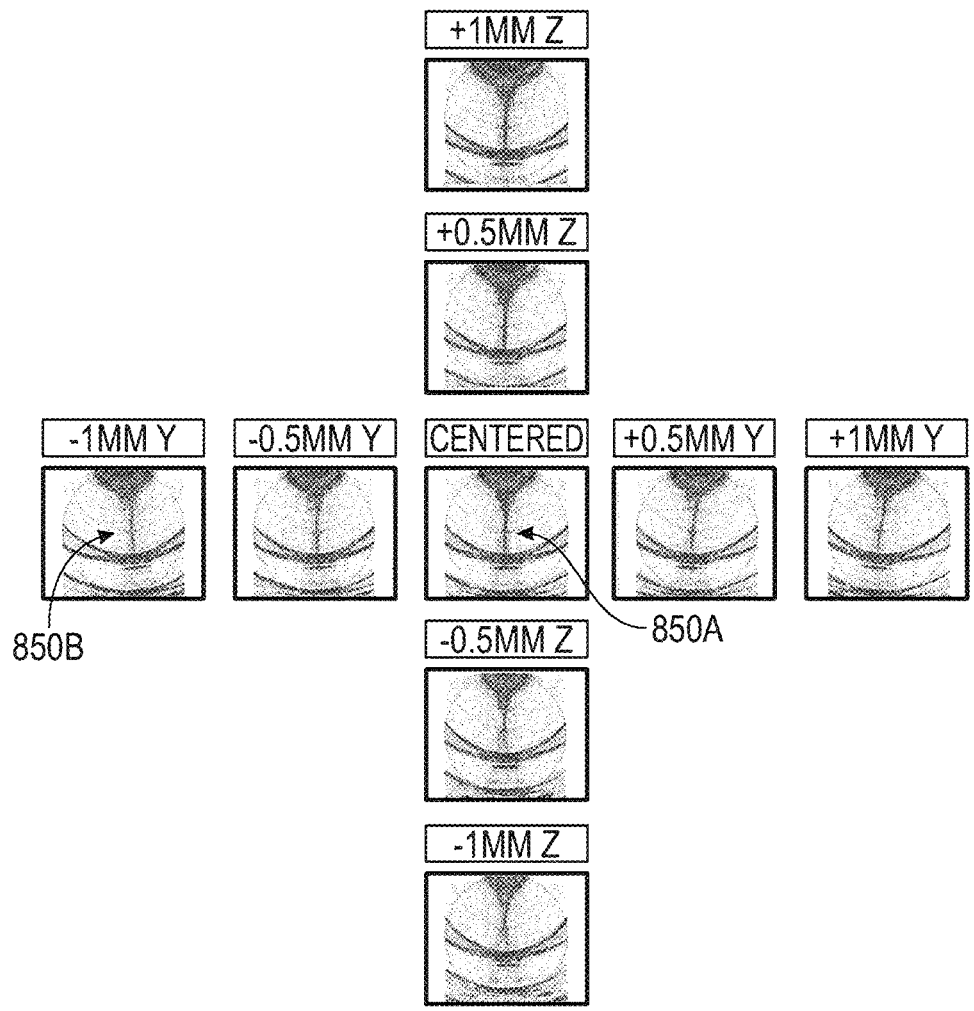
FIG. 8 shows zDDF results include use of the CAF-based technique for various probe positions relative to the bar under test.

FIG. 8 shows an illustrative example of an adaptive (e.g., CAF-enhanced) zDDF result in the same conditions as FIG. 7 but showing strong detection of the 0.5MWFBH even in the presence of mechanical misalignment (+/−1 mm y). This example is shown after one CAF iteration. Because zDDF is processed based on voxel position in space (e.g., inspection results are produced based on the position in the bar of said result) true-to-geometry imaging can be generated. In this example, the flaw 850A, 850B is readily apparent even when the bar is misaligned.

Figure 9:
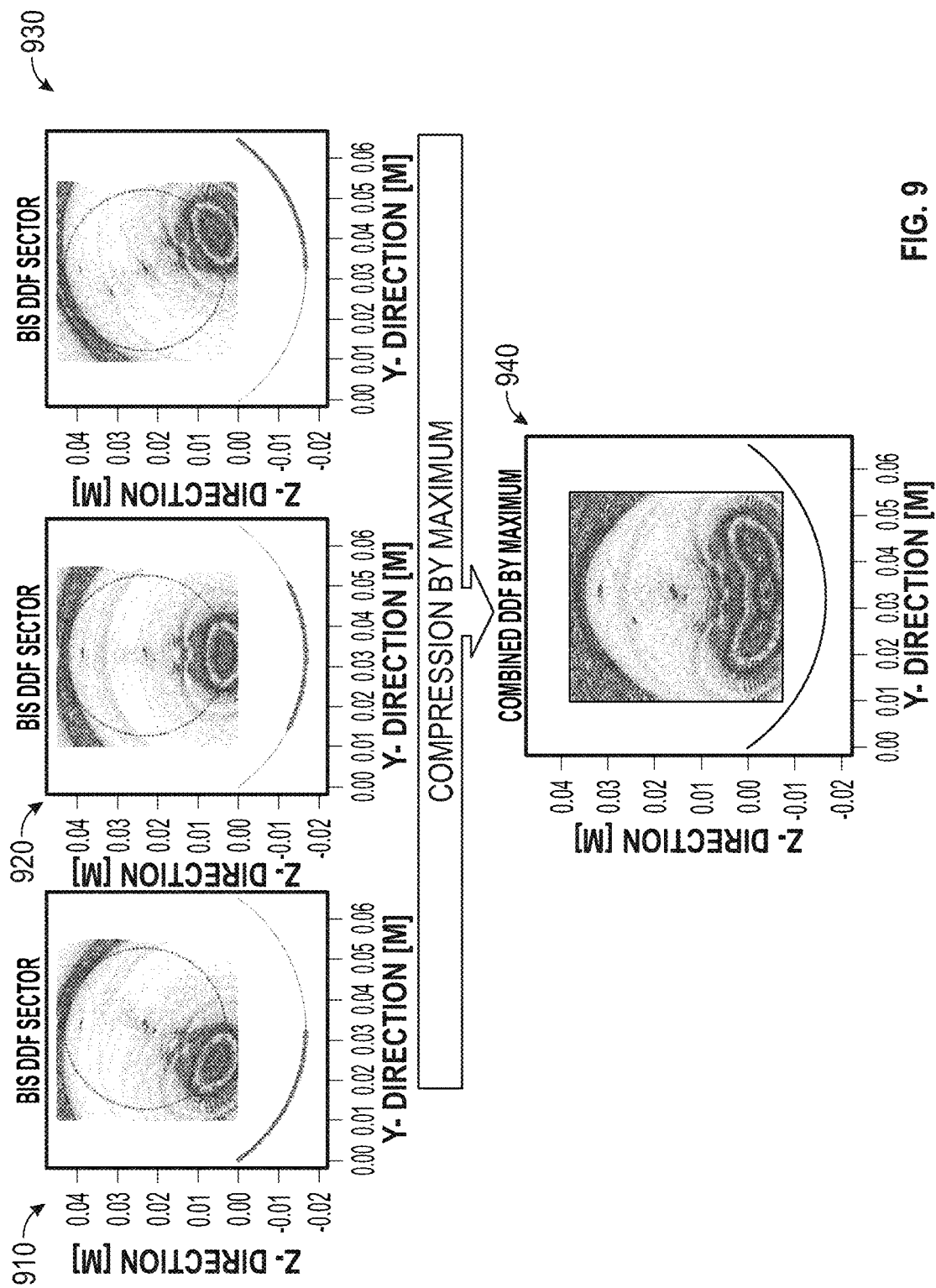
FIG. 9 shows aggregation of multiple images acquired using a zDDF approach.

FIG. 9 shows aggregation of multiple images acquired using a zDDF approach. In an example, inspection results 910, 920, 930 can be produced and imaged only in specified relevant areas for the inspection such as to allow for reduced processing requirements and superposition of the results of all (or a specified subset of probe acquisitions) into as few as a single image frame showing a representation of an interior region of the bar. The results can be combined by combining two or more of the individual area results by maximum as shown by the combined results 940. While this example shows three zDDF results, it is to be understood that two or more zDDF results can be combined to produce a meaningful image.

Figure 10:
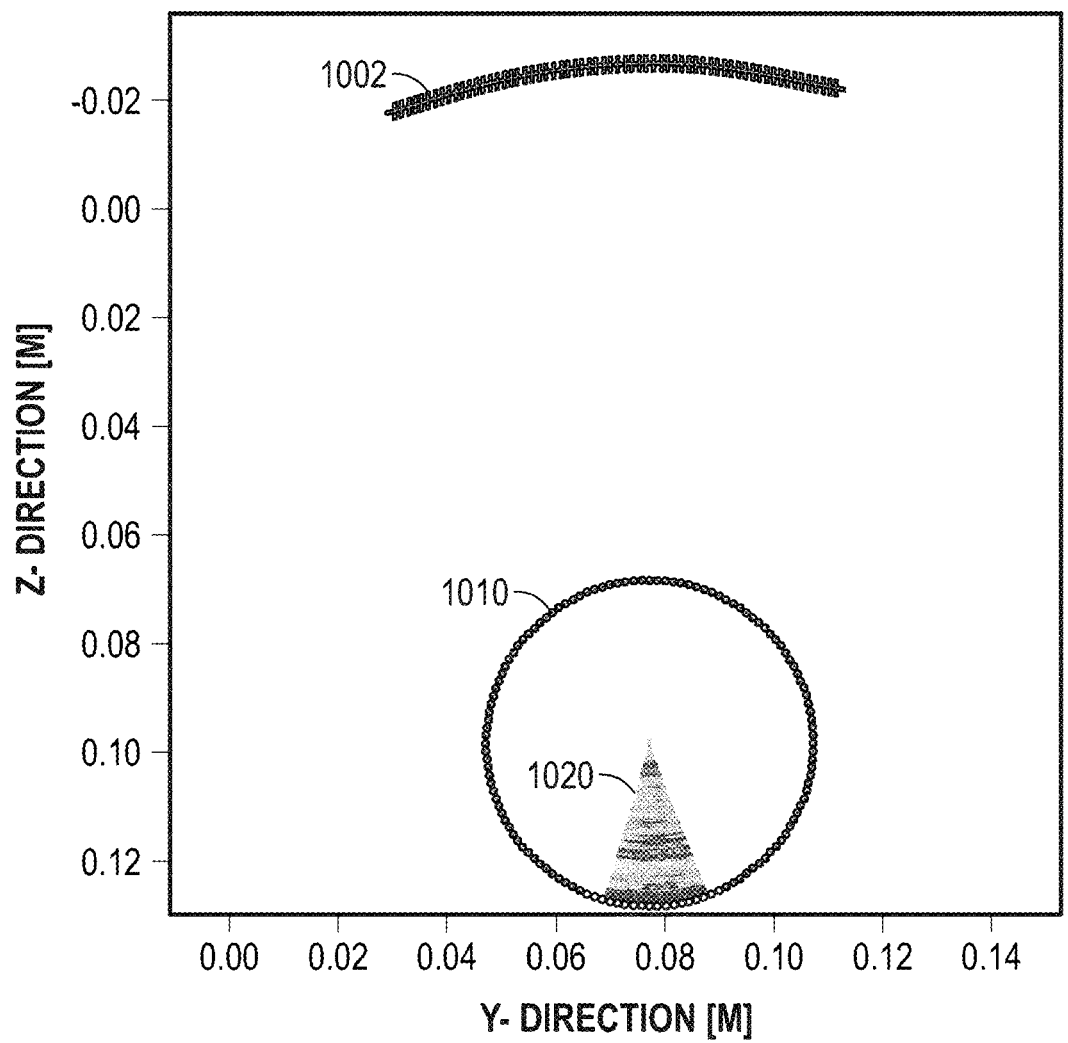
FIG. 10 shows an illustrative example of a sector-based zDDF.

FIG. 10 shows an illustrative example of a sector-based zDDF image of the inspection result. In this example a probe 1002 having a plurality of elements is configured to be used to provide inspection of a sector 1020 of the test structure 1010. In cases, inspection results may be provided for multiple sectors of the test structure. It is to be understood that at least some of the sectors may overlap with other result sectors. In some cases, none of the result sectors are configured to overlap.

Figure 11:
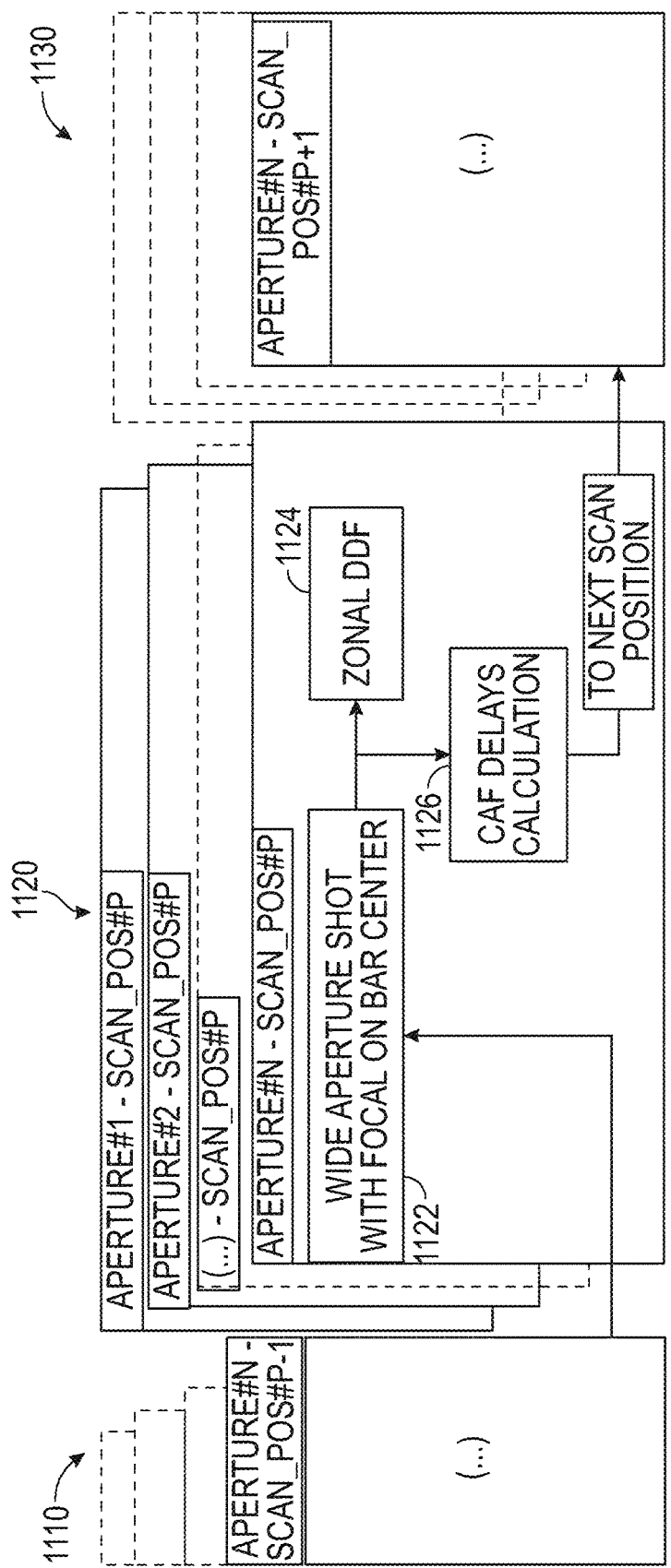
FIG. 11 illustrates generally a diagram illustrating an adaptive zDDF approach.

Generally, in order to reach desired productivity of inspection while obtaining the benefits of the adaptive acoustics provided by the Adaptive zDDF technique, inspection aperture firing can be combined with a CAF delay determination process. To perform such a combination, common parameters for the actual zDDF inspection and CAF firing are used, such as to establish a wavefront parallel to the surface of the bar. FIG. 11 illustrates generally a diagram illustrating an adaptive zDDF approach. In this example, the system iteratively cycles through a plurality of scan positions along a longitudinal axis of a bar under test or other structure being inspected. Each scan position can use a plurality of apertures to conduct the scan. In this example, a plurality of transmit apertures (e.g., zones) are used at scan position p−1 1110, the plurality of apertures are used at scan position p 1120, and the plurality of apertures are used at scan position p+1 1130. For each scan position and each aperture, a wide aperture shot at 1122 with focus on the structure center is used for the CAF delay calculation at 1126 and zDDF imaging at 1124. The CAF delay calculation at 1126 can be used for acquisition or imaging at a subsequent scan position, e.g., p+1 1130.

Figure 12:
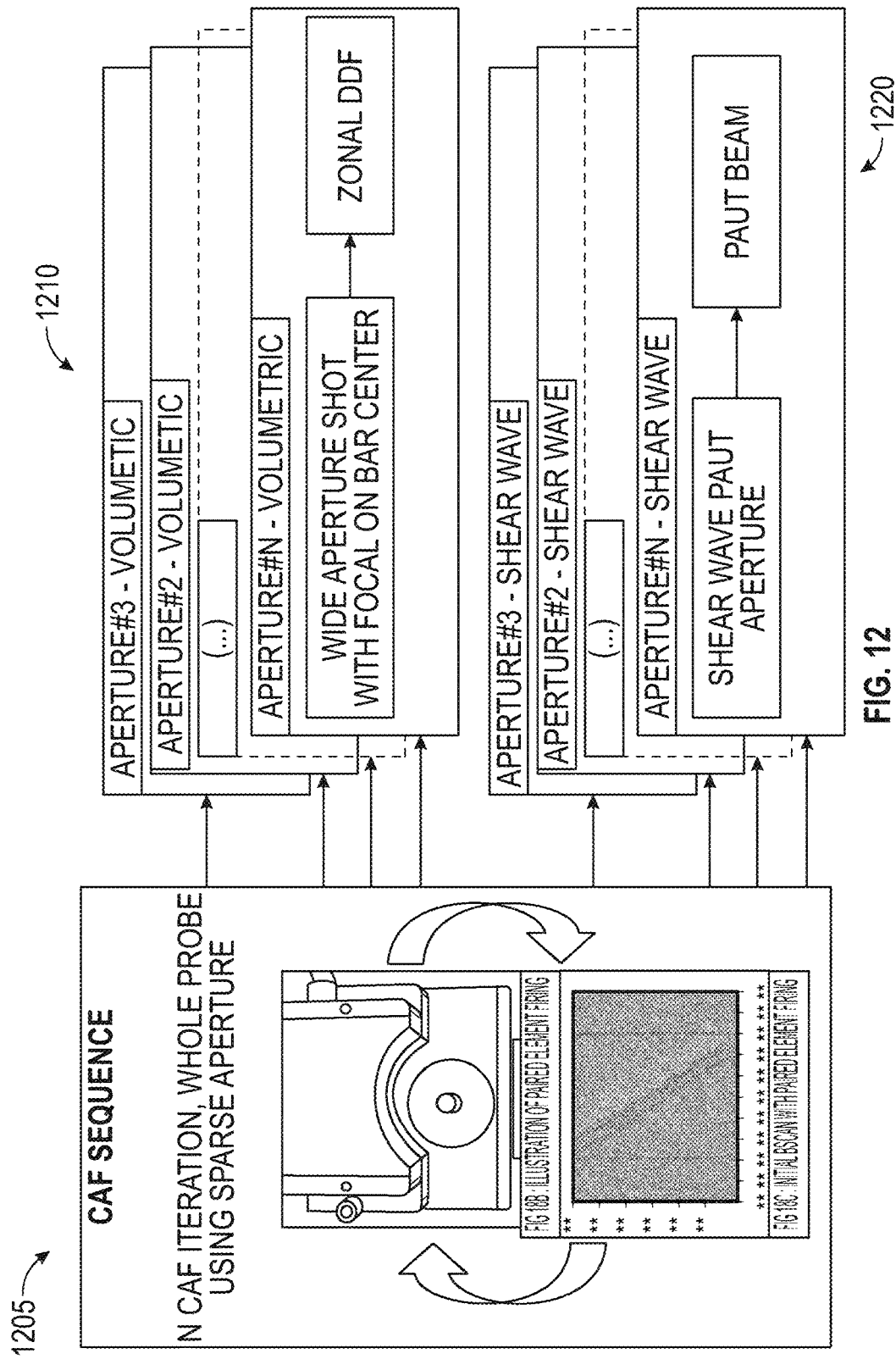
FIG. 12 illustrates an independent CAF iterative determination process that can be applied on the whole probe.

In the example of FIG. 12, an independent CAF iterative determination process can be applied on the whole probe (e.g., using sparse emission and reception if the front-end does not support acquisition with an entire probe at once). Elements of a probe may be multiplexed so to provide delays for the whole probe. When using multiplexing, the delay may then be interpolated to each individual element (including those not included in the original firing). The CAF iterative process at 1205 can produce delay factors compensating for off-nominal probe position relative to the structure under test, which can then be used to perform zDDF imaging at 1210 for at least one aperture. Such an approach also enables adaptive shear wave inspection through the application of CAF delays to Shear Wave (SW) PAUT beamforming delays that can be established at 1220. The technique of FIG. 12 may be about as fast as that used in FIG. 11 when only one CAF iteration is used and can provide value for bar inspection by accommodating a relatively large mechanical misalignment (e.g., decreasing a sensitivity of BIS to mechanical misalignment during inspection).

Figure 13:
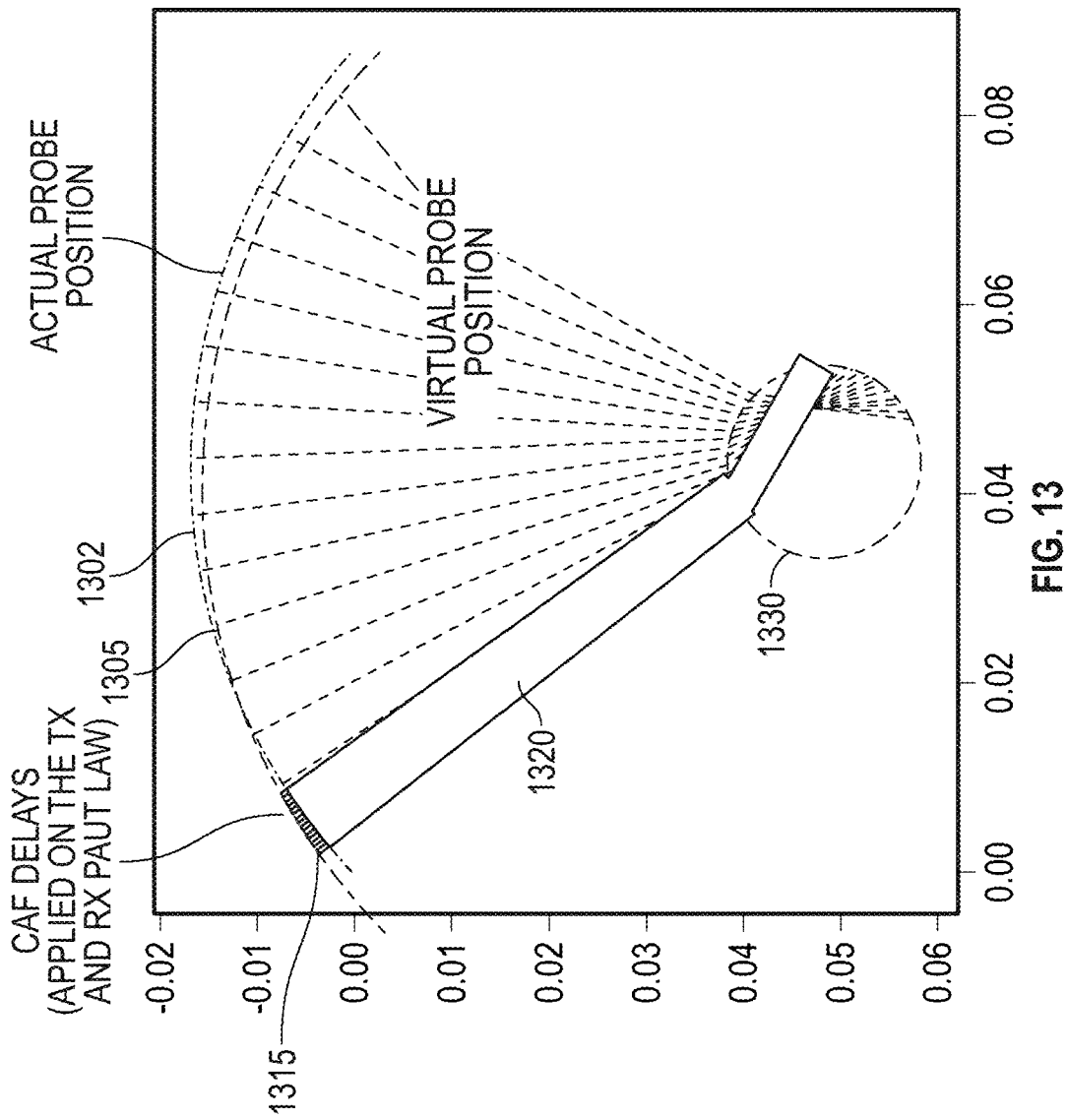
FIG. 13 illustrates an example in which the technique used in FIG. 12 can be useful.

FIG. 13 illustrates an example in which the technique used in FIG. 12 can be useful. In this example, a mechanical misalignment of the actual probe 1302 and the structure 1330 is compensated for by applying the CAF delays at 1315 on top of beamforming delays established for SW excitation. Such compensation can correct for a misalignment, such as providing shear wave excitation and receiving equivalent to a probe location corresponding to virtual probe 1305. One or more transmit apertures and/or zones 1320 can be used that encompass multiple elements.

Figure 14A:
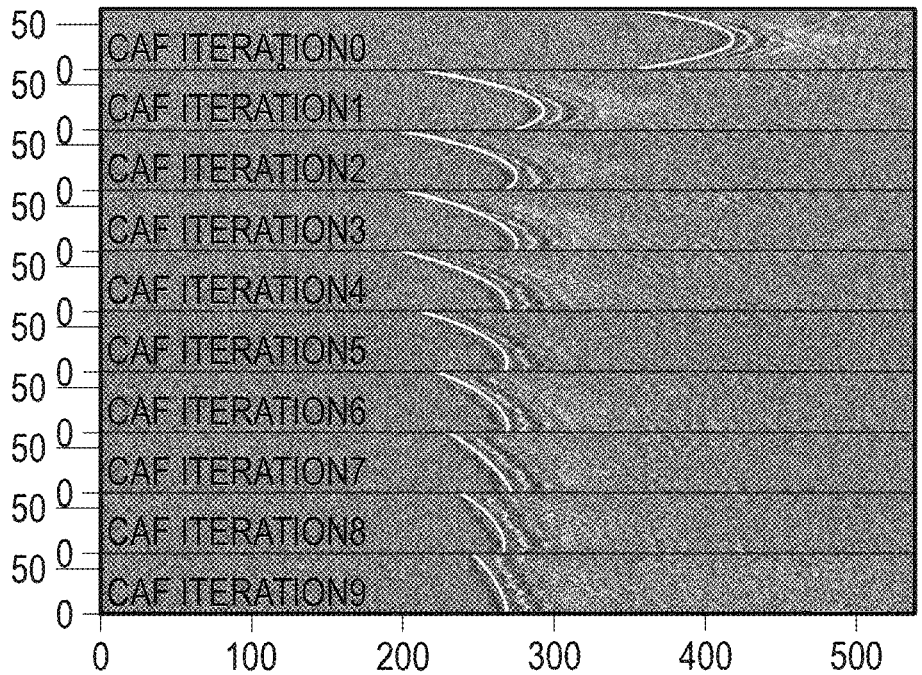
FIG. 14A illustrates CAF convergence by iteration on an elementary sub-aperture.
Figure 14B:
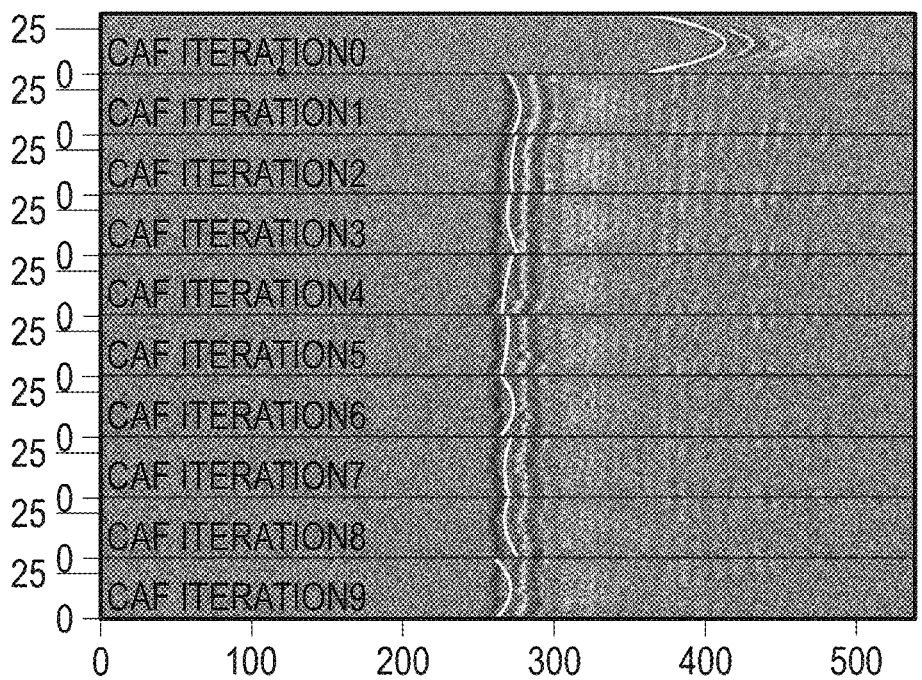
FIG. 14B shows CAF convergence by iteration CAF on summed sub-apertures.

FIG. 14A illustrates CAF convergence by iteration on an elementary sub-aperture. A sub aperture may include one or more elements. In this example, the sub-aperture includes two elements. In the ten iterations shown here, complete convergence is not achieved. In contrast, FIG. 14B shows CAF convergence by iteration CAF on summed sub-apertures. As can be observed, substantial convergence is likely achieved by the second iteration resulting in a much quicker process than what was used in FIG. 14A. The examples of FIGS. 14A and 14B use a 10 mm test bar that is offset by about 1 mm in the z direction.

Figure 15:
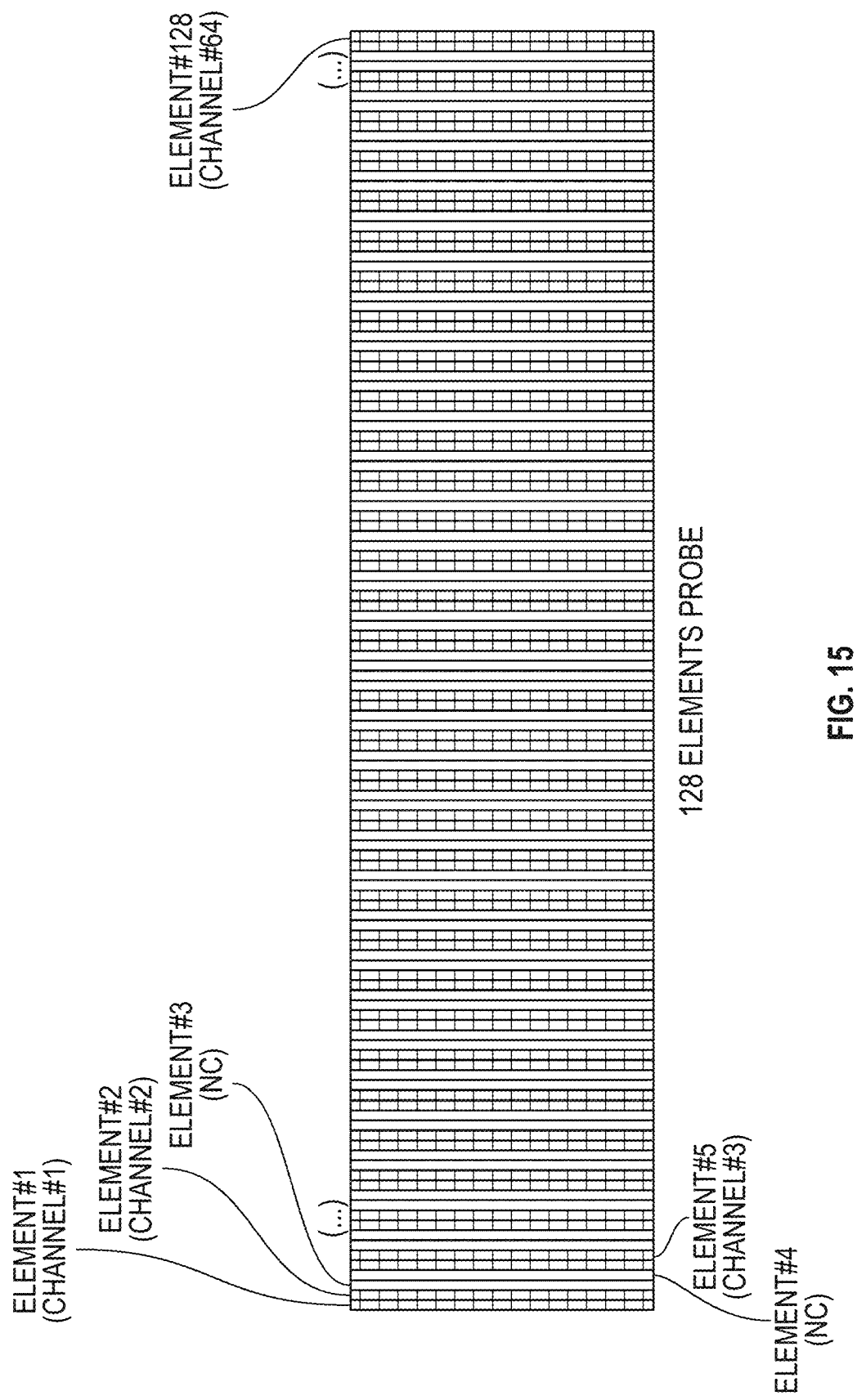
FIG. 15 shows an example element probe set-up for CAF performed using summed sub-apertures as described in FIG. 14B.

FIG. 15 shows an example element probe set-up for CAF performed using summed sub-apertures as described in FIG. 14B. Specifically, FIG. 15 is an example of how a 64 channel system can be connected to at least some elements of a 128 element probe using a multiplexer. Using this configuration, and by summing paired element in reception, the CAF was shown to converge in a single iteration on FIG. 14B. Using a system that can converge low (e.g., single) number of iterations greatly reduces the time for results when compared to an iterative process that only converges after many iterations.

Figure 16:
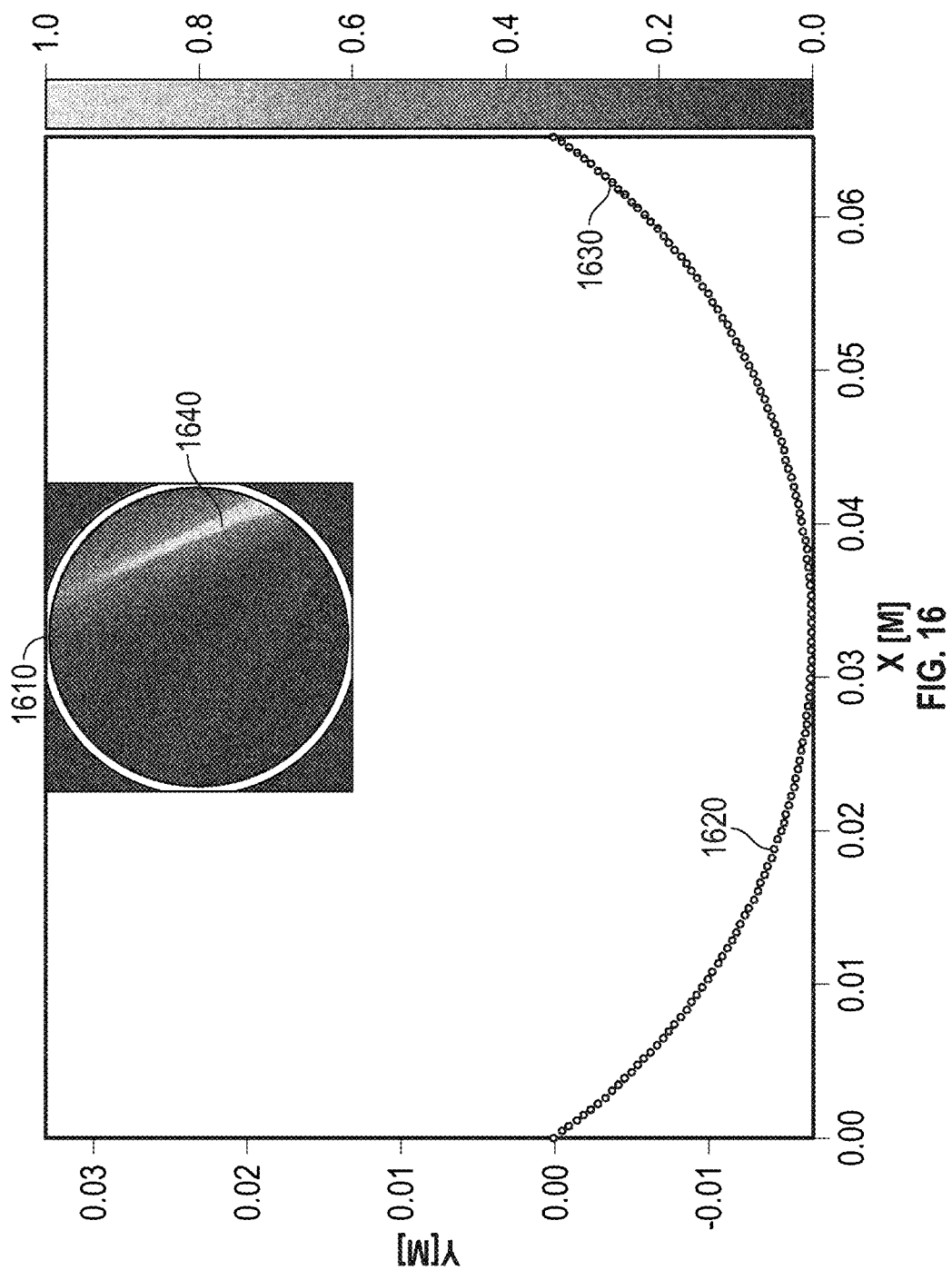
FIG. 16 illustrates a SW excitation scheme

FIG. 16 illustrates an ultrasonic beam generated using a SW excitation scheme in accordance with examples described herein. A probe 1620 is used to test structure 1610. In this example, the active aperture 1630 of the probe 1620 includes 16 elements with a 40 degree refractive angle beam 1640. The test structure in this example is a 20 mm diameter bar and the focus is on the back wall of the bar.

Figure 17:
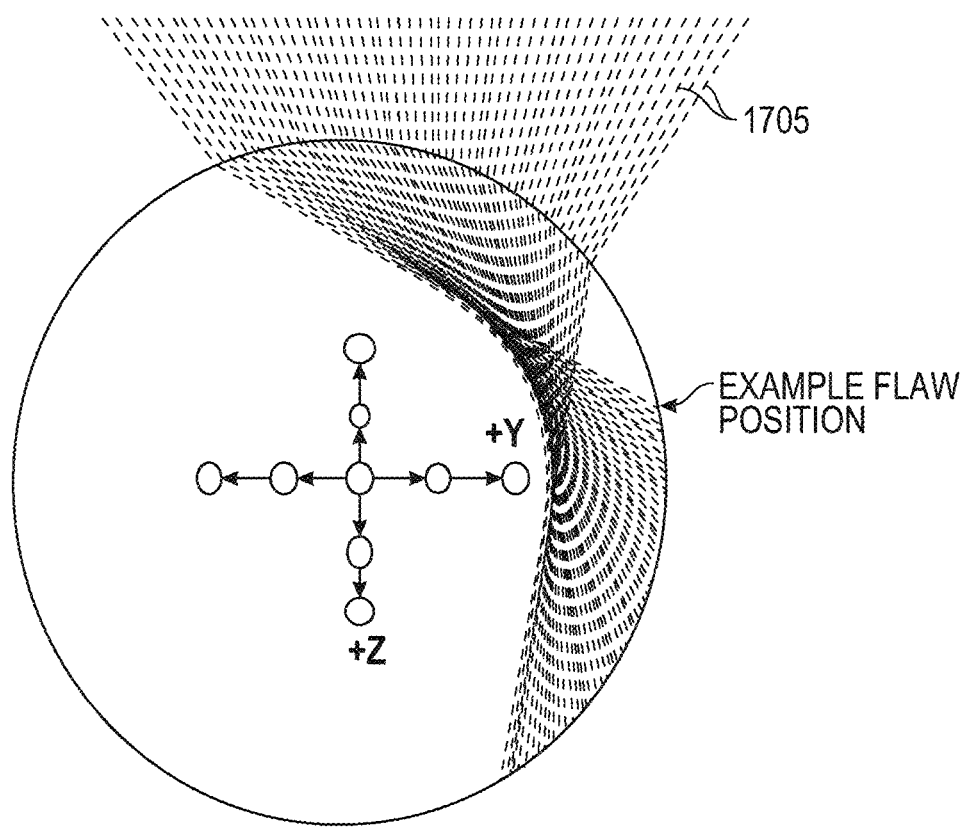
FIG. 17 illustrates use of different beam steering angles to achieve coverage of various surface flaw positions radially around a bar under test

FIG. 17 illustrates use of different active aperture positions to achieve coverage of various surface flaw positions radially around a bar under test. The various beams 1705 correspond to changing the position of the active aperture 1630 on the probe. In this example, the flaws are about 0.1 mm deep and are about 6.4 mm long longitudinal surface notches at three positions within the bar. Scan positions are at −1 mm, −0.5 mm, 0, 0.5 mm, and 1 mm in the y and z directions.

Figure 18:
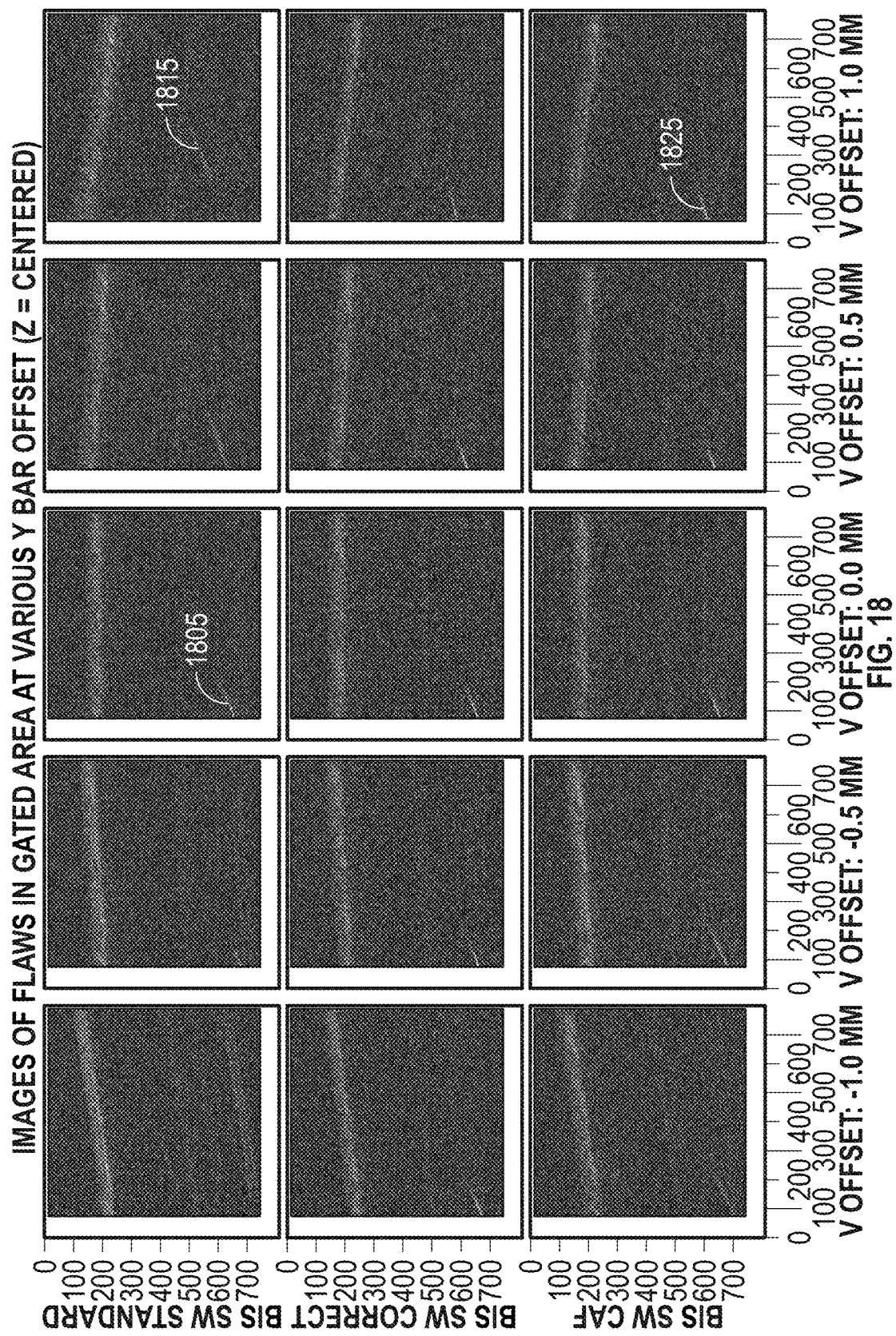
FIG. 18 illustrates simulated results of an impact of bar positioning offset on reference amplitudes corresponding to flaws
Figure 19:
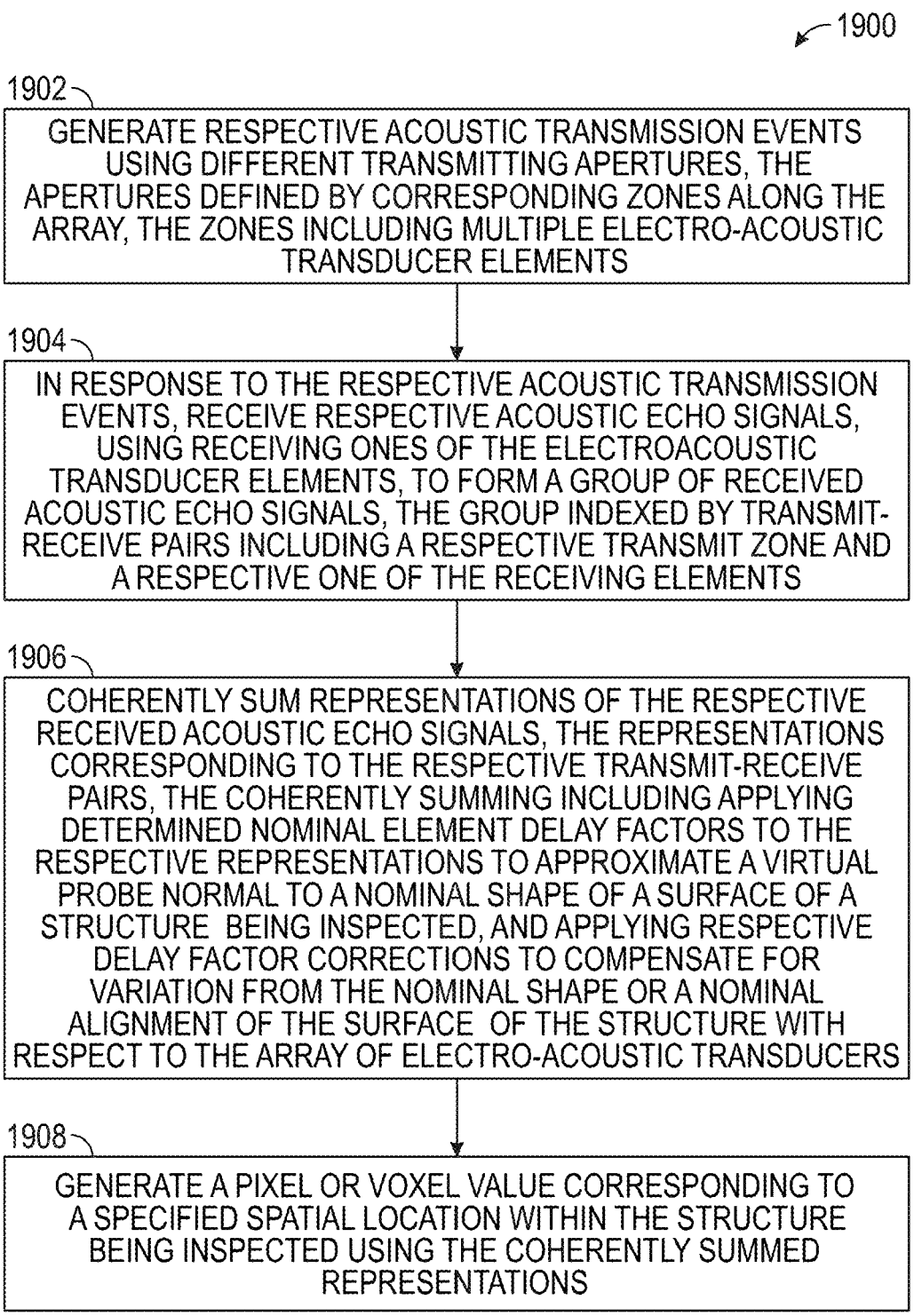
FIG. 19 shows a technique, such as a machine-implemented method, such as can be used to perform the adaptive ultrasonic inspections described in various examples herein.
Figure 20:
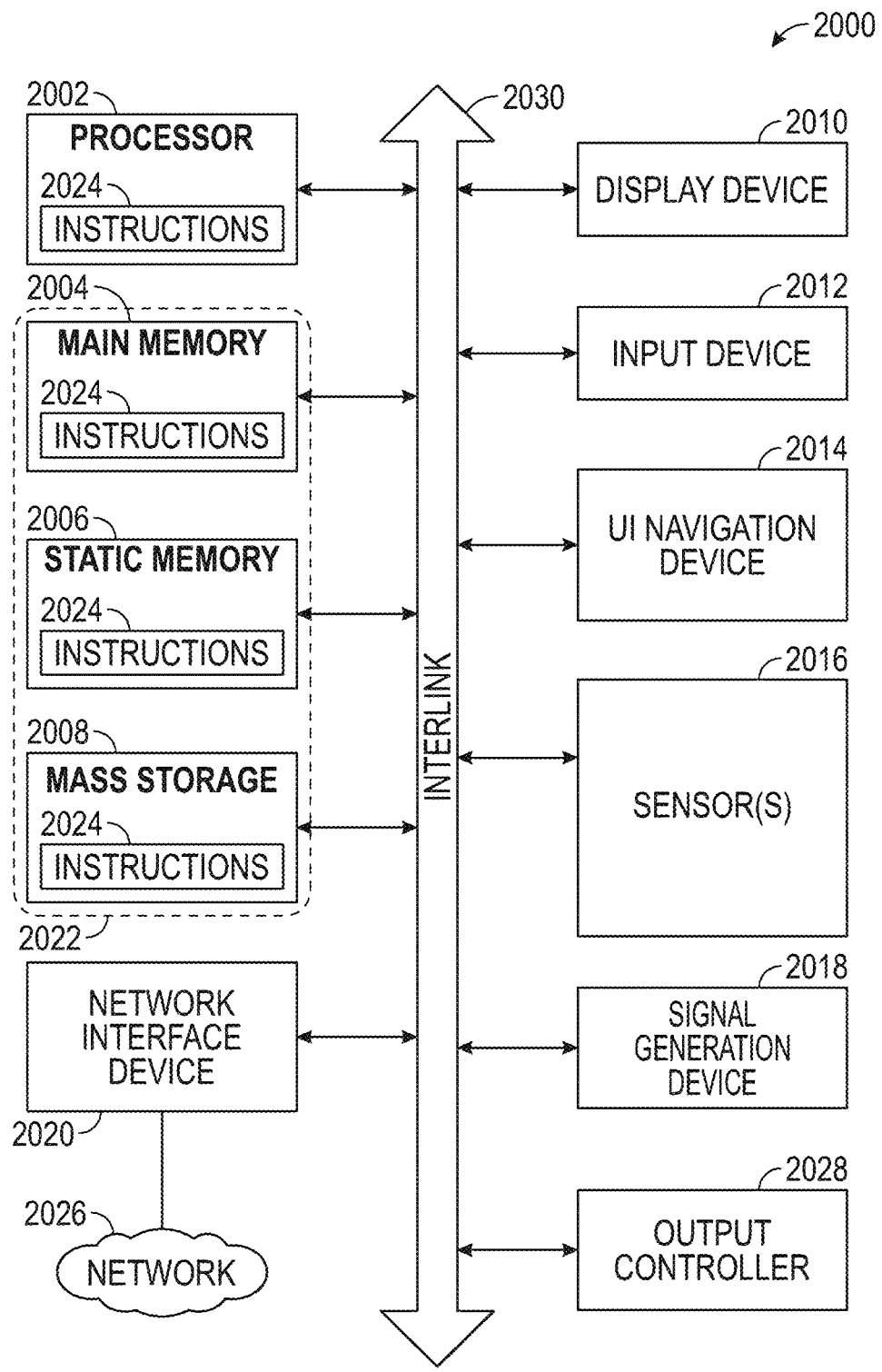
FIG. 20 illustrates a block diagram of an example comprising a machine upon which any one or more of the techniques (e.g., methodologies) discussed herein may be performed.

FIGS. 18-20 illustrate simulated results of an impact of bar positioning offset on reference amplitudes corresponding to flaws at an example flaw position. As can be observed, the flaw indication 1805 is readily apparent in the standard mode with a substantially centered bar. In this example, the flaw indicator is absent and/or much less visible in some of the larger offsets in the SW standard mode. For example, for a y-offset of +1 mm in the standard mode, the flaw indicator 1815 is much less visible. In contrast, the flaw indicator 1825 for the CAF mode with a +1 mm y-offset is easily observed. In the example of FIG. 18, the flaw amplitude dropped by more than 2 dB at y=0.5 mm for the CAF mode, but the flaw 1805 is still visible for all offsets for the corrected and CAF modes.

FIG. 19 shows a technique, such as a machine-implemented method, such as can be used to perform the adaptive ultrasonic inspection in accordance with examples described herein. In block 1902, routine 1900 generates respective acoustic transmission events using different transmitting apertures, the apertures defined by corresponding zones along the array, the zones including multiple electro-acoustic transducer elements. According to various implementations, at least three acoustic transmission events are generated using different transmitting apertures corresponding to different zones. At least one of the zones may at least partially overlap. In some cases, all of the zones are distinct and do not overlap.

In block 1904, routine 1900 in response to the respective acoustic transmission events, receives respective acoustic echo signals, using receiving ones of the electro-acoustic transducer elements, to form a group of received acoustic echo signals. The group is indexed by transmit-receive pairs including a respective transmit zone and a respective one of the receiving elements.

In block 1906, routine 1900 includes coherently summing representations of the respective received acoustic echo signals. The representations correspond to the respective transmit-receive pairs. The representations of the respective received acoustic echo signals may include A-scan representations. The coherently summing includes applying determined nominal element delay factors to the respective representations to approximate a beam normal to a nominal shape of a surface of a structure being inspected. The respective delay factor corrections may be determined using an iterative technique. For example, the iterative technique may include determining respective delay factors using respective apertures comprising two or more electro-acoustic transducer elements. According to various embodiments, the respective delay factors are determined using a single iteration. Respective delay factor corrections are applied to compensate for variation from the nominal shape or a nominal alignment of the surface of the structure with respect to the array of electro-acoustic transducers.

In block 1908, routine 1900 generates a pixel or voxel value corresponding to a specified spatial location within the structure being inspected using the coherently summed representations. According to various examples generating the pixel or voxel value comprises generating an image of multiple spatial locations using respective coherent summations, the respective coherent summations including applying the determined nominal element delay factors and applying the respective delay factor corrections.

According to various examples described herein, the structure under test is a bar. The image may represent a sector within a volume of the bar. Another acquisition may be performed to form another group of received acoustic echo signals to generate another image of a different sector within the volume of the bar. In some cases, the group is indexed by transmit-receive pairs including the respective transmit zone and a respective one of the receiving elements. Performing another acquisition may include re-positioning the array or the structure under test to allow insonification of a different portion of a surface of the structure under test by the array. Performing another acquisition may include using a second array configured to insonify a different portion of a surface of the structure under test.

According to various examples described herein, an acoustic transmission event is generated to excite a shear wave for imaging of a surface of the structure under test. Imaging the surface of the structure under test may include coherently summing representations of respective received acoustic echo signals, and applying the determined nominal element delay factors to the respective representations to approximate a virtual probe normal to the nominal shape of the surface of the structure being inspected, and applying respective delay factor corrections to compensate for variation from the nominal shape or the nominal alignment of the surface of the structure with respect to the array of electro-acoustic transducers. A pixel or voxel value that corresponds to a specified spatial location on the structure being inspected may be generated using the coherently summed representations.

FIG. 20 illustrates a block diagram of an example comprising a machine 2000 upon which any one or more of the techniques (e.g., methodologies) discussed herein may be performed. In various examples, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2030. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2200 may additionally include a storage device (e.g., drive unit) 2008, a signal generation device 2018 (e.g., a speaker), a network interface device 2020, and one or more sensors 2016, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2008 may include a machine-readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2008 may constitute machine-readable media.

While the machine-readable medium 2022 is illustrated as a single medium, the term "machine-readable medium" may include a single medium or multiple media (e.g., a centralized or distributed database, and/or associated caches and servers) configured to store the one or more instructions 2024.

The term "machine-readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic or other phase-change or state-change memory circuits: magnetic disks, such as internal hard disks and removable disks: magneto-optical disks: and CD-ROM and DVD-ROM disks.

The instructions 2024 may further be transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others). In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the claims, the terms "including" and "comprising" are open-ended, that is, a system, device, article, composition, formulation, or process that includes elements in addition to those listed after such a term in a claim are still deemed to fall within the scope of that claim. Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A machine-implemented method for acoustic evaluation of a target using an array of electro-acoustic transducers, the method comprising:
generating respective acoustic transmission events using different transmitting apertures, the apertures defined by corresponding zones along the array, the zones including multiple electro-acoustic transducer elements;
in response to the respective acoustic transmission events, receiving respective acoustic echo signals, using receiving ones of the electro-acoustic transducer elements, to form a group of received acoustic echo signals, the group indexed by transmit-receive pairs including a respective transmit zone and a respective one of the receiving elements;
coherently summing representations of the respective received acoustic echo signals, the representations corresponding to the respective transmit-receive pairs, the coherently summing including applying determined nominal element delay factors to the respective representations to approximate a virtual probe normal to a nominal shape of a surface of a structure being inspected, and applying respective delay factor corrections to compensate for variation from the nominal shape or a nominal alignment of the surface of the structure with respect to the array of electro-acoustic transducers; and
generating a pixel or voxel value corresponding to a specified spatial location within the structure being inspected using the coherently summed representations.

2. The machine-implemented method of claim 1, wherein generating the respective acoustic transmission events comprises generating at least three acoustic transmission events using different transmitting apertures corresponding to different zones.

3. The machine-implemented method of claim 2, wherein the zones partially overlap.

4. The machine-implemented method of claim 1, comprising determining the respective delay factor corrections using a single iteration.

5. The machine-implemented method of claim 1, comprising determining the respective delay factors using respective apertures comprising two or more electro-acoustic transducer elements.

6. The machine-implemented method of claim 1, wherein the representations of the respective received acoustic echo signals comprise A-scan representations.

7. The machine-implemented method of claim 6, wherein generating a pixel or voxel value corresponding to a specified spatial location on or within the structure being inspected includes generating an image of multiple spatial locations using respective coherent summations, the respective coherent summations including applying the determined nominal element delay factors and applying the respective delay factor corrections.

8. The machine-implemented method of claim 7, wherein the structure under test is a bar.

9. The machine-implemented method of claim 8, wherein the image represents a sector within a volume of the bar.

10. The machine-implemented method of claim 9, comprising performing another acquisition to form another group of received acoustic echo signals, the group indexed by transmit-receive pairs including the respective transmit zone and a respective one of the receiving elements, to generate another image of a different sector within the volume of the bar.

11. The machine-implemented method of claim 10, wherein the performing another acquisition includes re-positioning the array or the structure under test to allow insonification of a different portion of a surface of the structure under test by the array.

12. The machine-implemented method of claim 10, wherein the performing another acquisition includes using a second array configured to insonify a different portion of a surface of the structure under test.

13. The machine-implemented method of claim 1, comprising generating an acoustic transmission event to excite a shear wave for imaging of a surface of the structure under test; and wherein imaging the surface of the structure under test comprises coherently summing representations of respective received acoustic echo signals, and applying the determined nominal element delay factors to the respective representations to approximate a beam normal to the nominal shape of the surface of the structure being inspected, and applying respective delay factor corrections to compensate for variation from the nominal shape or the nominal alignment of the surface of the structure with respect to the array of electro-acoustic transducers; and generating a pixel or voxel value corresponding to a specified spatial location on the structure being inspected using the coherently summed representations.

14. An ultrasonic inspection system for acoustic evaluation of a target using an array of electro-acoustic transducers, the system comprising:

an analog front end comprising transmit and receive circuitry coupled to the array of electro-acoustic transducer elements;

a processor circuit communicatively coupled with the analog front end; an a memory circuit comprising instructions that, when executed by the processor circuit, cause the system to:

generate respective acoustic transmission events using different transmitting apertures, the apertures defined by corresponding zones along the array, the zones including multiple electro-acoustic transducer elements;

in response to the respective acoustic transmission events, receive respective acoustic echo signals, using receiving ones of the electro-acoustic transducer elements, to form a group of received acoustic echo signals, the group indexed by transmit-receive pairs including a respective transmit zone and a respective one of the receiving elements;

coherently sum representations of the respective received acoustic echo signals, the representations corresponding to the respective transmit-receive pairs, the coherently summing including applying determined nominal element delay factors to the respective representations to approximate a beam normal to a nominal shape of a surface of a structure being inspected, and applying respective delay factor corrections to compensate for variation from the nominal shape or a nominal alignment of the surface of the structure with respect to the array of electro-acoustic transducers; and generate a pixel or voxel value corresponding to a specified spatial location within the structure being inspected using the coherently summed representations.

15. The ultrasonic inspection system of claim 14, wherein the instructions to generate the respective acoustic transmission events comprises instructions to generate at least three acoustic transmission events using different transmitting apertures corresponding to different zones.

16. The ultrasonic inspection system of claim 15, wherein the zones partially overlap.

17. The ultrasonic inspection system of claim 14, further comprising instructions to determine the respective delay factor corrections using a single iteration.

18. The ultrasonic inspection system of claim 14, comprising determining the respective delay factors using respective apertures comprising two or more electro-acoustic transducer elements.

19. The ultrasonic inspection system of claim 14, wherein the representations of the respective received acoustic echo signals comprise A-scan representations.

20. The ultrasonic inspection system of claim 19, wherein the instructions to generate a pixel or voxel value corresponding to a specified spatial location on or within the structure being inspected includes instructions to generate an image of multiple spatial locations using respective coherent summations, the respective coherent summations including applying the determined nominal element delay factors and applying the respective delay factor corrections.

21. The ultrasonic inspection system of claim 20, wherein the structure under test is a bar.

22. The ultrasonic inspection system of claim 21, wherein the image represents a sector within a volume of the bar.

23. The ultrasonic inspection system of claim 22, comprising instructions to perform another acquisition to form another group of received acoustic echo signals, the group indexed by transmit-receive pairs including the respective transmit zone and a respective one of the receiving elements, to generate another image of a different sector within the volume of the bar.

24. The ultrasonic inspection system of claim 23, wherein the instructions to perform another acquisition includes instructions to re-position the array or the structure under test to allow insonification of a different portion of a surface of the structure under test by the array.

25. The ultrasonic inspection system of claim 24, wherein the instructions to perform another acquisition includes instructions to use a second array configured to insonify a different portion of a surface of the structure under test.

26. The ultrasonic inspection system of claim 14, comprising:

instructions to generate an acoustic transmission event to excite a shear wave for imaging of a surface of the structure under test; and wherein imaging the surface of the structure under test comprises coherently summing representations of respective received acoustic echo signals, and applying the determined nominal element delay factors to the respective representations to approximate a beam normal to the nominal shape of the surface of the structure being inspected, and applying respective delay factor corrections to compensate for variation from the nominal shape or the nominal alignment of the surface of the structure with respect to the array of electro-acoustic transducers; and instructions to generate a pixel or voxel value corresponding to a specified spatial location on the structure being inspected using the coherently summed representations.

27. An ultrasonic inspection system for acoustic evaluation of a target using an array of electro-acoustic transducers, comprising:
   a means for generating respective acoustic transmission events using different transmitting apertures, the apertures defined by corresponding zones along the array, the zones including multiple electro-acoustic transducer elements;
   in response to the respective acoustic transmission events, means for receiving respective acoustic echo signals, using receiving ones of the electro-acoustic transducer elements, to form a group of received acoustic echo signals, the group indexed by transmit-receive pairs including a respective transmit zone and a respective one of the receiving elements;
   a means for coherently summing representations of the respective received acoustic echo signals, the representations corresponding to the respective transmit-receive pairs, the coherently summing including applying determined nominal element delay factors to the respective representations to approximate a beam normal to a nominal shape of a surface of a structure being inspected, and applying respective delay factor corrections to compensate for variation from the nominal shape or a nominal alignment of the surface of the structure with respect to the array of electro-acoustic transducers; and
   a means for generating a pixel or voxel value corresponding to a specified spatial location within the structure being inspected using the coherently summed representations.

* * * * *